US008750792B2

(12) United States Patent
Bowman et al.

(10) Patent No.: US 8,750,792 B2
(45) Date of Patent: Jun. 10, 2014

(54) TRANSMITTER FOR POINT-TO-POINT RADIO SYSTEM

(71) Applicant: Remec Broadband Wireless, LLC, San Diego, CA (US)

(72) Inventors: Charles Bowman, San Diego, CA (US); Behzad Moeenziai, San Diego, CA (US)

(73) Assignee: Remec Broadband Wireless, LLC, San Diego, CA (US)

( * ) Notice: Subject to any disclaimer, the term of this patent is extended or adjusted under 35 U.S.C. 154(b) by 0 days.

(21) Appl. No.: 13/836,081

(22) Filed: Mar. 15, 2013

(65) Prior Publication Data

US 2014/0030977 A1 Jan. 30, 2014

Related U.S. Application Data

(60) Provisional application No. 61/676,263, filed on Jul. 26, 2012, provisional application No. 61/676,269, filed on Jul. 26, 2012.

(51) Int. Cl.
*H04B 7/24* (2006.01)

(52) U.S. Cl.
USPC ........... 455/39; 455/63.1; 455/69; 455/127.2; 455/67.11; 455/444; 455/101; 455/132; 455/272; 455/52.1; 455/278.1

(58) Field of Classification Search
USPC .............. 455/39, 63.1, 69, 127.2, 67.11, 444, 455/101, 132, 272, 52.1, 52.3, 278.1
See application file for complete search history.

(56) References Cited

U.S. PATENT DOCUMENTS

| | | | |
|---|---|---|---|
| 3,490,025 A | | 1/1970 | Pickles |
| 4,001,691 A | * | 1/1977 | Gruenberg ................... 375/214 |
| 4,747,160 A | | 5/1988 | Bossard |
| 5,266,961 A | | 11/1993 | Milroy |
| 5,349,363 A | | 9/1994 | Milroy |
| 5,412,394 A | | 5/1995 | Milroy |
| 5,469,165 A | | 11/1995 | Milroy |
| 5,483,248 A | | 1/1996 | Milroy |
| 5,583,524 A | | 12/1996 | Milroy |

(Continued)

FOREIGN PATENT DOCUMENTS

EP 2403314 A1 1/2012

OTHER PUBLICATIONS

U.S. Appl. No. 13/950,112 (Unpublished).
U.S. Appl. No. 14/030,959 (Unpublished).

(Continued)

*Primary Examiner* — Edward F. Urban
*Assistant Examiner* — Ganiyu A Hanidu
(74) *Attorney, Agent, or Firm* — Kilpatrick Townsend & Stockton LLP

(57) ABSTRACT

Embodiments of the present invention are directed to methods, apparatuses, and systems for implementing a point-to-point radio architecture in which the isolation needed between the transmitter and receiver may be achieved through the use of separate antennas. One embodiment is directed at a radio head comprising a transmitter configured to operate at a first frequency, a receiver configured to operate at a second frequency, and a processor coupled to both the transmitter and the receiver. The transmitter is further coupled to a first antenna interface coupled to a first antenna configured to transmit signals at the first frequency. The receiver is further coupled to a second antenna interface coupled to a second antenna configured to receive signals at the second frequency.

24 Claims, 18 Drawing Sheets

(56) References Cited

U.S. PATENT DOCUMENTS

| | | |
|---|---|---|
| 5,604,505 A | 2/1997 | Matterer |
| 5,771,567 A | 6/1998 | Pierce et al. |
| 5,835,068 A | 11/1998 | Paul et al. |
| 5,905,472 A | 5/1999 | Wolfson et al. |
| 5,926,077 A | 7/1999 | Milroy |
| 5,995,055 A | 11/1999 | Milroy |
| 6,006,072 A * | 12/1999 | Tsujimoto .................. 455/63.1 |
| 6,075,494 A | 6/2000 | Milroy |
| 6,101,705 A | 8/2000 | Wolfson et al. |
| 6,201,509 B1 | 3/2001 | Zhang et al. |
| 6,396,443 B1 | 5/2002 | Conklin et al. |
| 6,426,814 B1 | 7/2002 | Berger et al. |
| 6,430,805 B1 | 8/2002 | Ekmekji et al. |
| 6,539,239 B1 | 3/2003 | Loughran et al. |
| 6,653,985 B2 | 11/2003 | Sikina et al. |
| 6,717,801 B1 | 4/2004 | Castell et al. |
| 6,870,733 B2 | 3/2005 | Castell et al. |
| 7,079,082 B2 | 7/2006 | Iskander et al. |
| 7,079,816 B2 | 7/2006 | Khorram et al. |
| 7,119,745 B2 | 10/2006 | Gaucher et al. |
| 7,127,255 B2 | 10/2006 | Hsu et al. |
| 7,129,892 B2 | 10/2006 | Borlez et al. |
| 7,200,379 B2 | 4/2007 | Edwards et al. |
| 7,206,608 B1 | 4/2007 | Wu et al. |
| 7,289,494 B2 | 10/2007 | Lakkis |
| 7,349,439 B2 | 3/2008 | Lakkis |
| 7,349,478 B2 | 3/2008 | Lakkis |
| 7,363,058 B2 | 4/2008 | Gustaf |
| 7,406,647 B2 | 7/2008 | Lakkis |
| 7,432,871 B2 | 10/2008 | Ekmekji et al. |
| 7,545,329 B2 | 6/2009 | Guacher et al. |
| 7,558,591 B2 | 7/2009 | Li et al. |
| 7,583,985 B2 | 9/2009 | Matson et al. |
| 7,667,652 B2 | 2/2010 | Gevargiz et al. |
| 7,702,371 B2 | 4/2010 | Edwards et al. |
| 7,792,548 B2 | 9/2010 | Rofougaran |
| 7,835,769 B2 | 11/2010 | Gustaf |
| 8,045,935 B2 | 10/2011 | Lakkis et al. |
| 8,049,676 B2 | 11/2011 | Yoon et al. |
| 8,073,515 B2 | 12/2011 | Rofougaran |
| 8,077,664 B2 | 12/2011 | Zangi |
| 8,086,182 B2 | 12/2011 | Rofougaran |
| 8,190,102 B2 | 5/2012 | Rofougaran |
| 8,243,658 B2 | 8/2012 | Zangi |
| 2001/0005685 A1 | 6/2001 | Nishimori et al. |
| 2002/0021764 A1 | 2/2002 | Posti |
| 2002/0155812 A1 | 10/2002 | Takada |
| 2002/0173336 A1 | 11/2002 | Ranta et al. |
| 2002/0183013 A1 | 12/2002 | Auckland et al. |
| 2004/0053620 A1 | 3/2004 | Garrison et al. |
| 2004/0063438 A1 | 4/2004 | Hsu et al. |
| 2004/0137947 A1 | 7/2004 | Nimmo-Smith |
| 2005/0147079 A1 | 7/2005 | Lakkis |
| 2005/0233710 A1 | 10/2005 | Lakkis et al. |
| 2006/0246909 A1 * | 11/2006 | Petermann .................. 455/444 |
| 2007/0222701 A1 | 9/2007 | Yoon et al. |
| 2008/0043653 A1 | 2/2008 | Lakkis |
| 2008/0043654 A1 | 2/2008 | Lakkis |
| 2008/0049652 A1 | 2/2008 | Lakkis |
| 2008/0056186 A1 | 3/2008 | Lakkis |
| 2008/0062921 A1 | 3/2008 | Lakkis |
| 2008/0232305 A1 | 9/2008 | Oren et al. |
| 2009/0067383 A1 | 3/2009 | Fleming et al. |
| 2009/0284440 A1 | 11/2009 | Weidmann et al. |
| 2010/0159858 A1 | 6/2010 | Dent et al. |
| 2010/0311353 A1 | 12/2010 | Teillet et al. |
| 2011/0053646 A1 | 3/2011 | Kundmann et al. |
| 2011/0053648 A1 | 3/2011 | Gustaf |
| 2011/0158114 A1 | 6/2011 | Novak et al. |
| 2011/0286473 A1 | 11/2011 | Currivan et al. |
| 2012/0008510 A1 * | 1/2012 | Cai et al. .................. 370/252 |
| 2012/0039603 A1 * | 2/2012 | Wiegner et al. .................. 398/43 |
| 2012/0176907 A1 | 7/2012 | Hartenstein et al. |
| 2012/0235872 A1 * | 9/2012 | Lewis et al. .................. 343/753 |
| 2013/0142281 A1 | 6/2013 | Hastings et al. |
| 2013/0272217 A1 * | 10/2013 | Negus et al. .................. 370/329 |

OTHER PUBLICATIONS

Office Action issued in U.S. Appl. No. 13/950,112 on Dec. 19, 2013.
Office Action issued in U.S. Appl. No. 14/030,959 on Dec. 19, 2013.
International Search Report and Written Opinion dated Oct. 18, 2013 for International Application No. PCT/US2013/052072, 11 pages.
Non-Final Office Action issued in child U.S. Appl. No. 14/034,431 on Jan. 28, 2014, 14 pages.

* cited by examiner

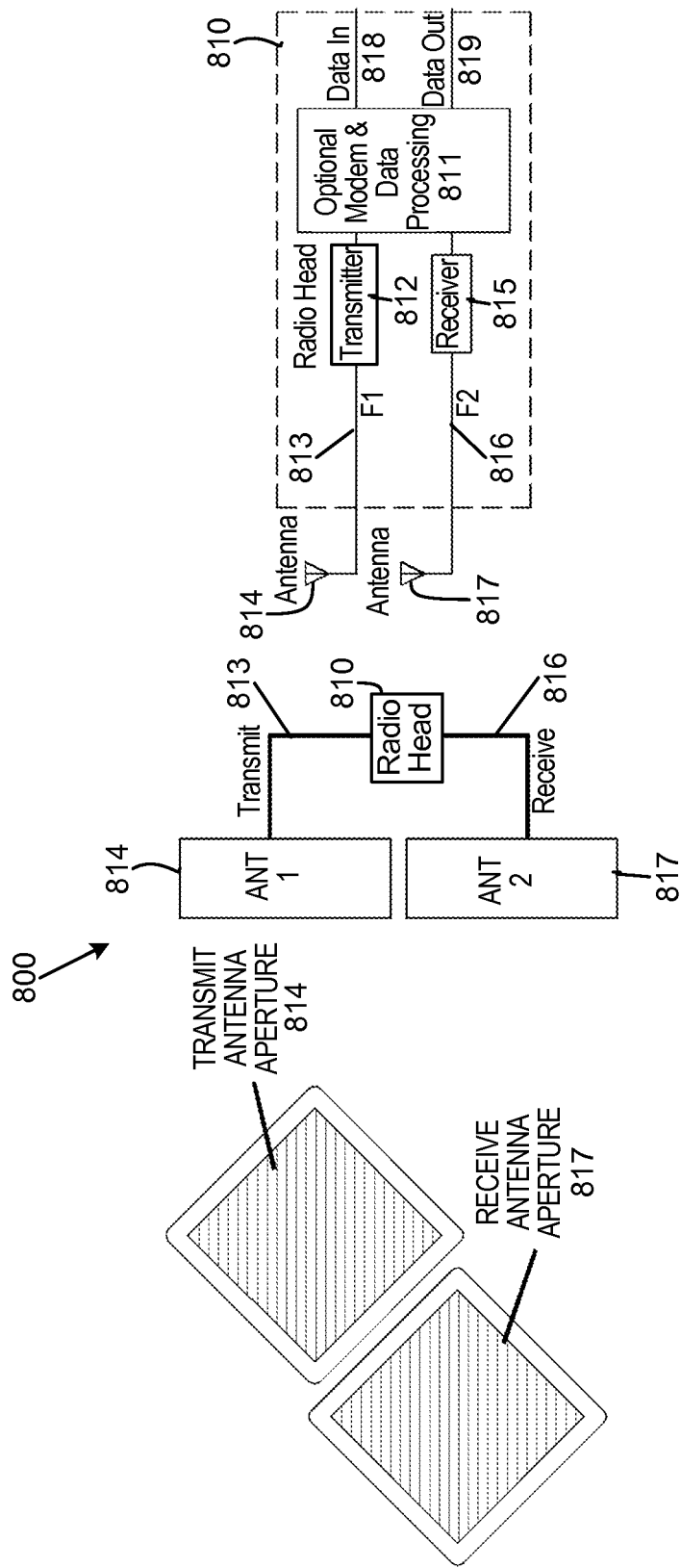

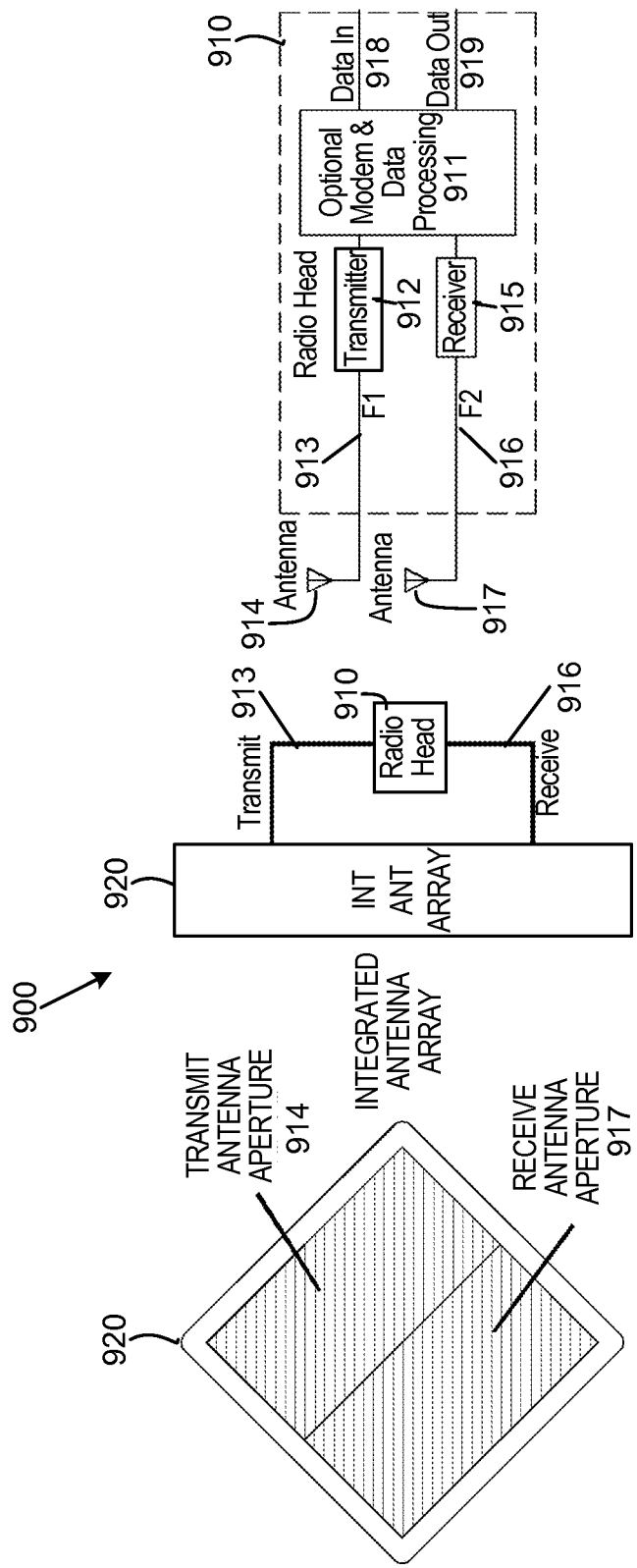

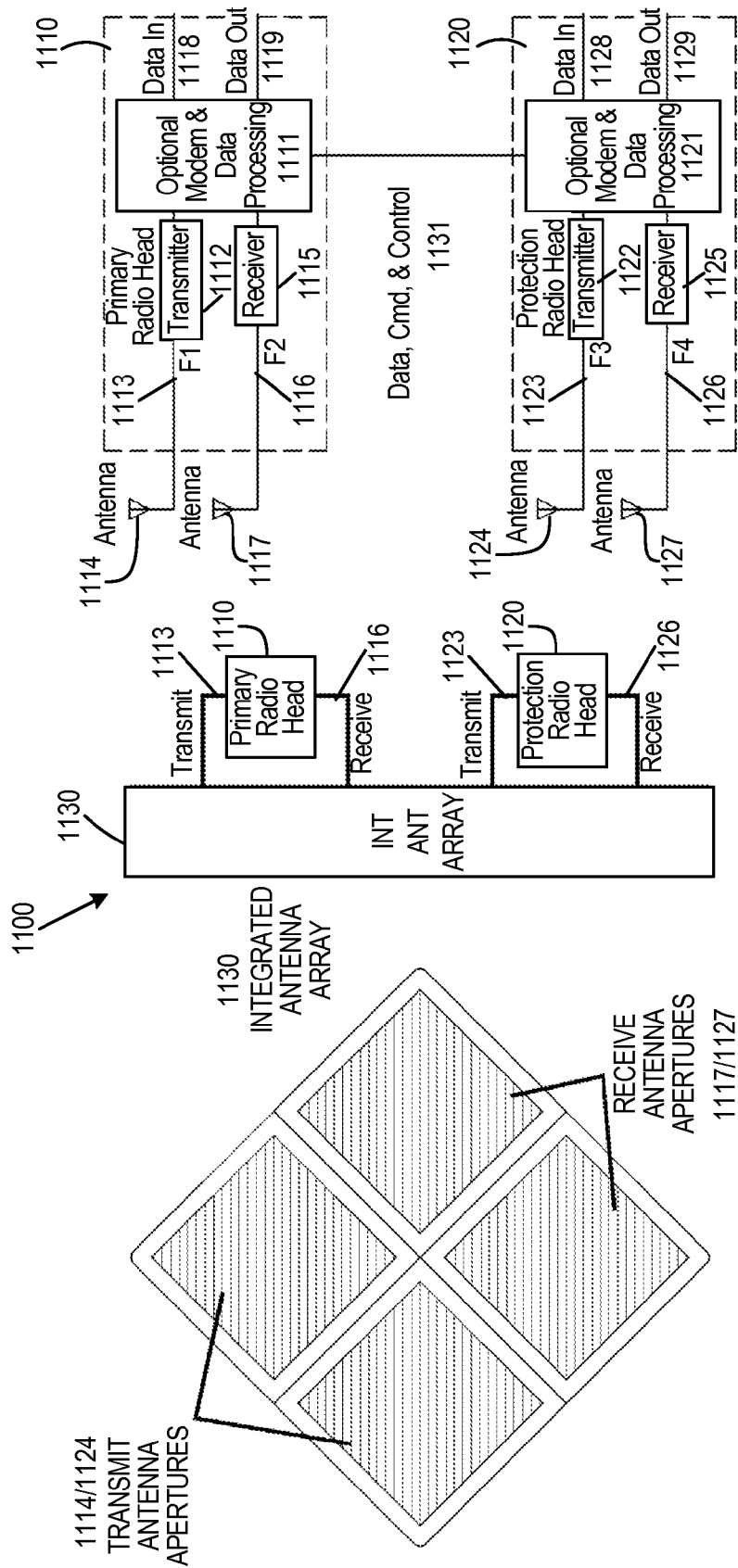

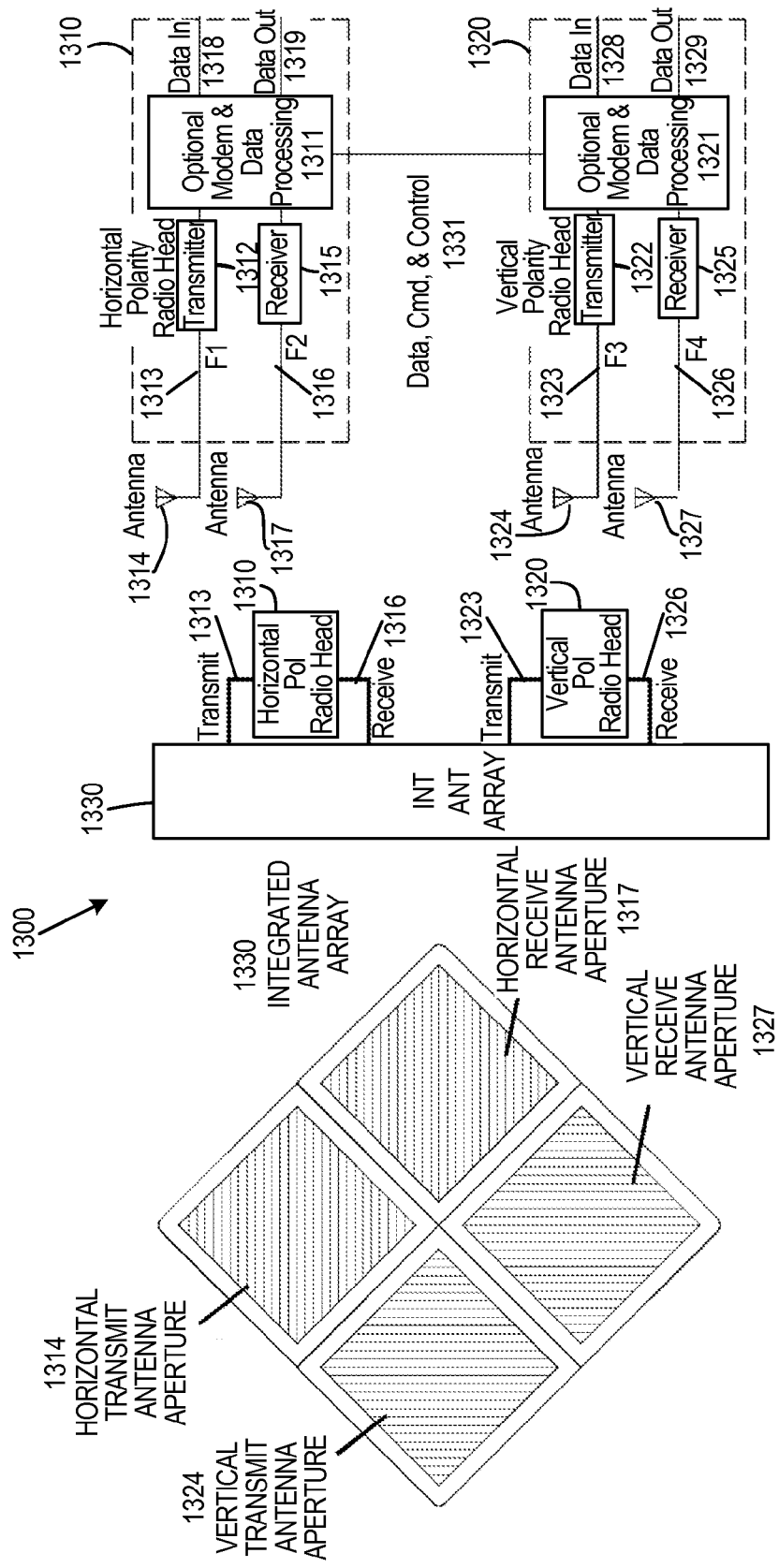

PRIOR ART
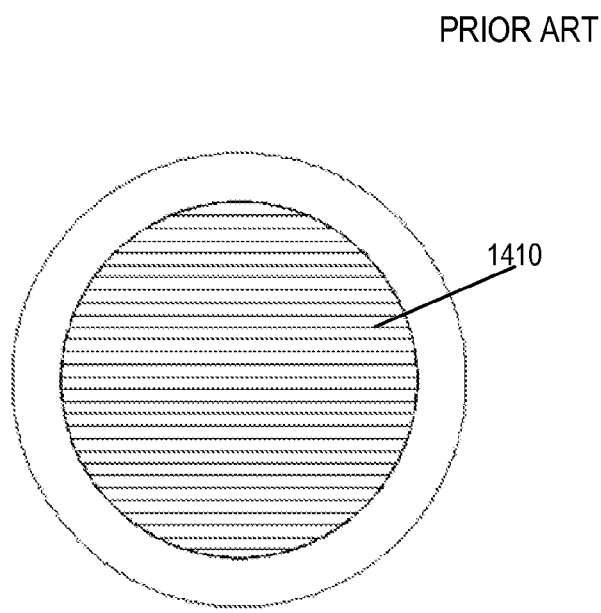
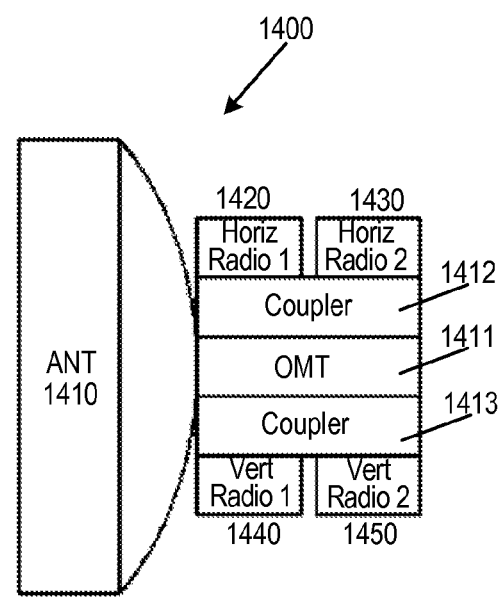
FIG. 14A
FIG. 14B

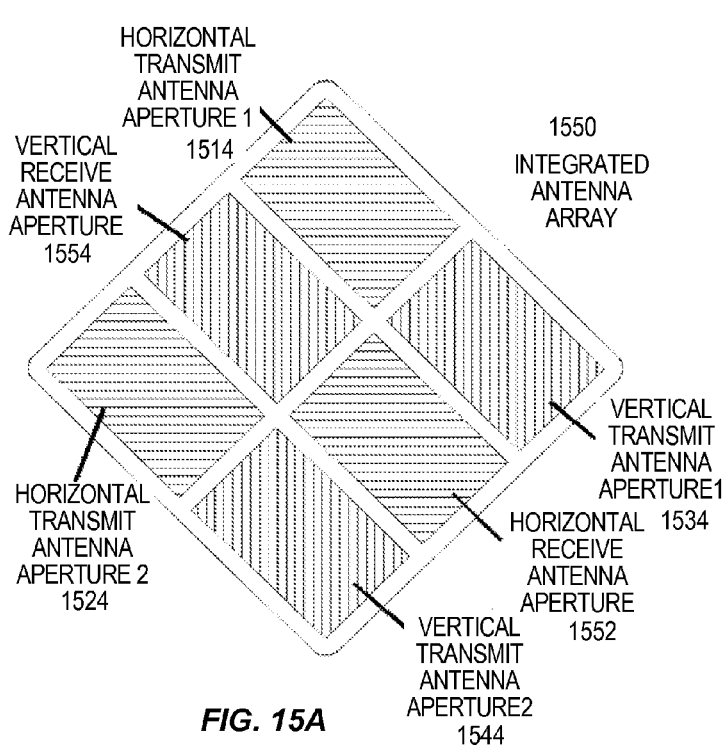
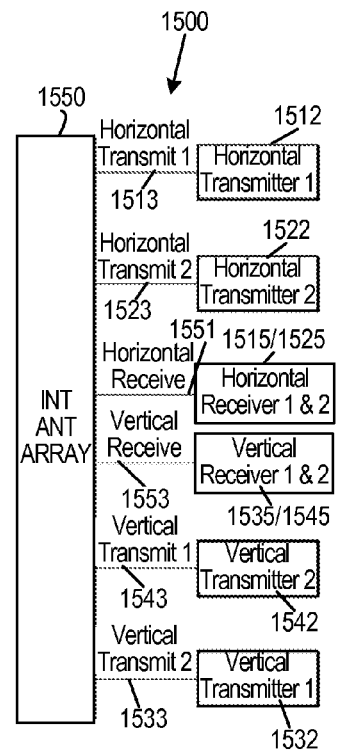
FIG. 15A
FIG. 15B
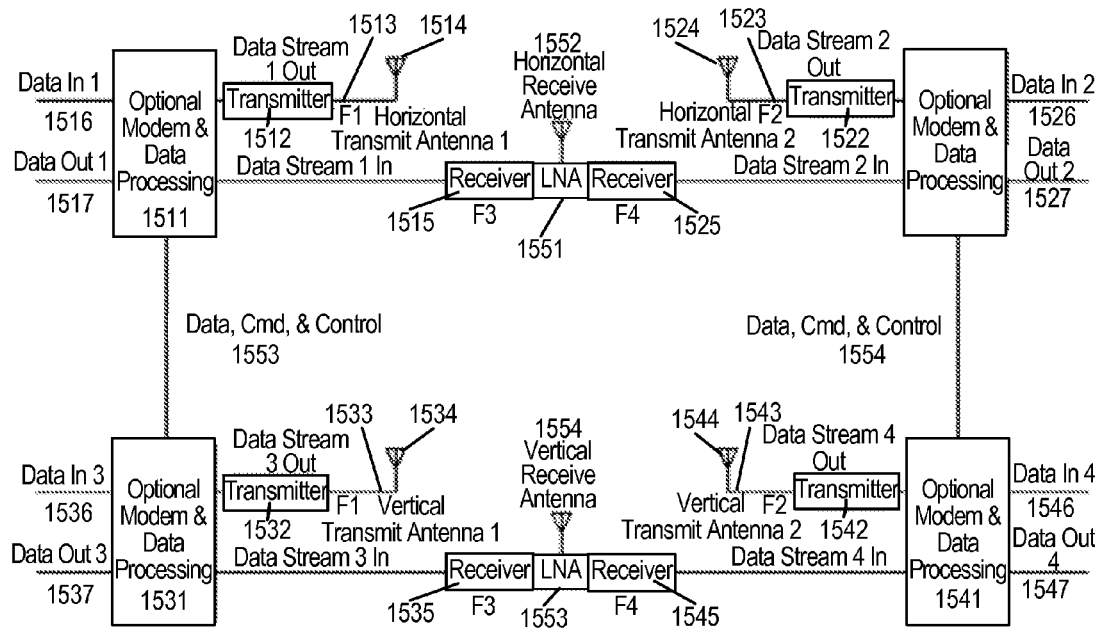
FIG. 15C

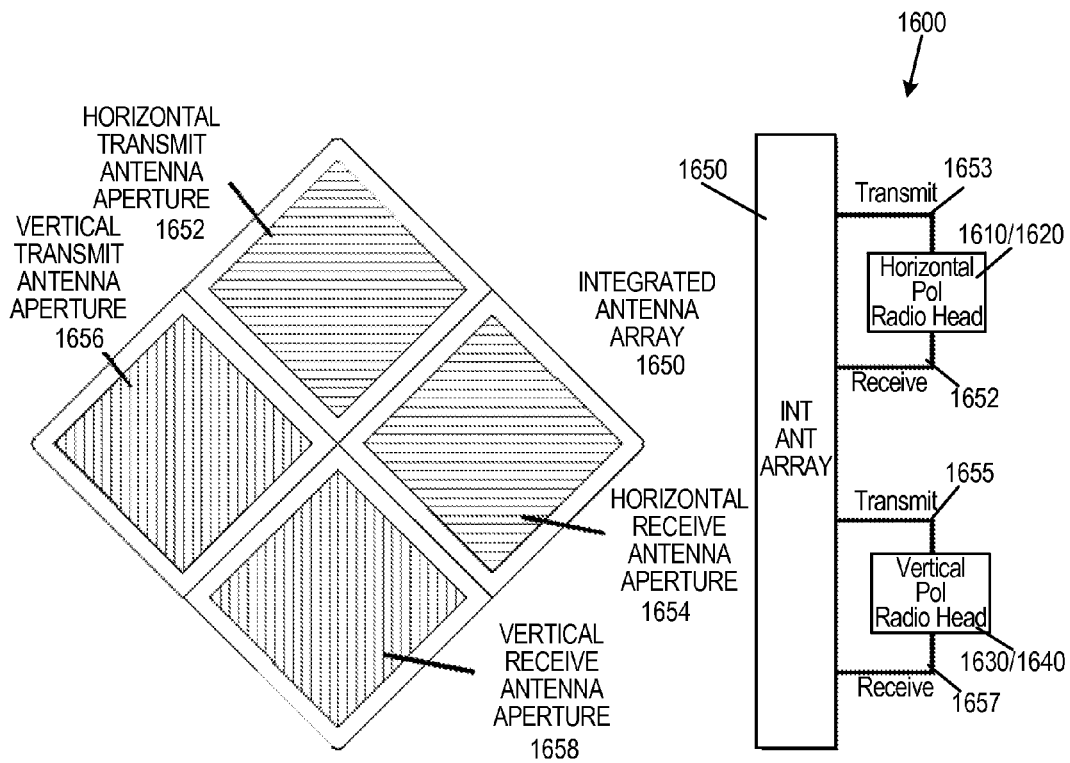
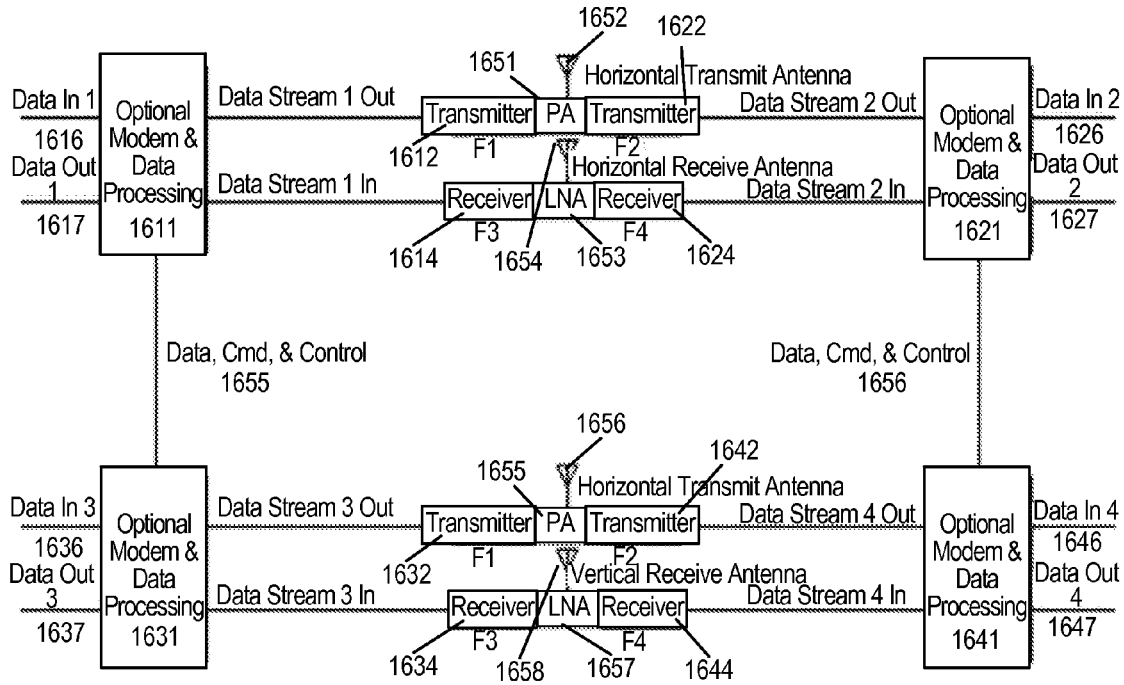

TRANSMITTER FOR POINT-TO-POINT RADIO SYSTEM

CROSS-REFERENCE TO RELATED APPLICATIONS

This application claims the benefit of priority of U.S. Provisional Patent Application Ser. No. 61/676,263 entitled "Transmitter for Point-to-Point Radio System" to Charles Bowman and Behzad Ziai, filed Jul. 26, 2012 and also claims the benefit of priority to U.S. Provisional Patent Application Ser. No. 61/676,269 entitled "Simultaneous Bidirectional Transmission for Radio Systems" to Charles Bowman and Behzad Ziai, filed Jul. 26, 2012. Priority of the filing date of Jul. 26, 2012 is hereby claimed, and the disclosures of both Provisional patent applications are hereby incorporated by reference. This application is related to co-pending U.S. Patent Application filed on the same day as the present application, entitled "Simultaneous Bidirectional Transmission for Radio Systems", to Charles Bowman and Behzad Ziai, which is hereby incorporated by reference.

BACKGROUND

1. Field of the Invention

The subject matter of this disclosure relates to data communications and, more particularly, to signal transmission in point-to-point radio systems.

2. Description of the Related Art

As the need for the transmission of voice, video, and data have constantly escalated with the increasing use of wireless access devices, the importance of maximizing the utilization of radio frequency (RF) spectrum has increased sharply. For licensed band point-to-point systems, combinations of mechanisms have been employed to increase available data rates. Two principal philosophies can be employed: (1) Increase the number of data bits sent per Hz of bandwidth (b/Hz), or (2) increase the amount of bandwidth (Hz) used.

Increases in the b/Hz rate have been constantly growing through improving digital processing techniques and improved analog fidelity in the analog RF circuits, and increases in the bandwidth have increased to a limited extent by using wider licensed bandwidths, by using both horizontal and vertical polarizations along with digital processing techniques (cross polarization interference cancellation or "XPIC"). The most aggressive techniques employ both.

However, existing systems implementing these techniques incorporate filters, diplexers, couplers, Ortho-Mode Transducer (OMT), and/or other elements that lead to signal loss and degradation of signals, higher costs, more weight, increased complexity, constraints on transmission range of components, and additional design problems. Accordingly, there is a need for a point-to-point communication radio system that avoids the cost, electrical losses, weight, tuning range limitations, and parametric limitations associated with the filters, diplexers, couplers, and OMT combining networks of present systems.

SUMMARY

Embodiments disclosed herein implement a radio architecture in which the isolation needed between the transmitter and receiver may be achieved through the use of separate antennas. The separate antennas may have sufficient isolation to (1) block the high power levels of the transmitter from desensitizing or damaging the receiver circuits within the transmitted spectrum, and (2) block the noise transmitted by the transmitter within the receive spectrum.

In accordance with the disclosure, one embodiment is directed to a radio head in a point-to-point communication system. The radio head comprises a transmitter configured to operate at a first frequency, a receiver configured to operate at a second frequency, and a processor coupled to both the transmitter and the receiver. The transmitter is further coupled to a first antenna interface coupled to a first antenna configured to transmit signals at the first frequency. The receiver is further coupled to a second antenna interface coupled to a second antenna configured to receive signals at the second frequency.

In another aspect of the radio head, the radio head is a first radio head and the processor is a first processor. The first processor is coupled to a second processor of a second radio head. The second radio head comprises a second transmitter configured to operate at a third frequency, a second receiver configured to operate at a fourth frequency. The second processor is coupled to both the second transmitter and the second receiver, the second transmitter is further coupled to a third antenna interface coupled to a third antenna configured to transmit signals at the third frequency, the second receiver is further coupled to a fourth antenna interface coupled to a fourth antenna configured to receive signals at the fourth frequency. The first radio head and the second radio head may operate alternately, wherein the first frequency and the third frequency are the same, and wherein the second frequency and the fourth frequency are the same.

In another aspect of the radio head, the first radio head and the second radio head operate simultaneously, wherein the first frequency and the third frequency are different, and wherein the second frequency and the fourth frequency are different.

In another aspect of the radio head, the first radio head and the second radio head operate simultaneously on different frequencies and are configured to send and receive signals on orthogonally different polarizations.

In another aspect of the radio head, the first radio head and the second radio head operate simultaneously on the same frequencies but send and receive signals on orthogonally different polarizations.

In another aspect of the invention, a point-to-point radio communication system implementing two or more radio heads described above.

Other features and advantages of the disclosure should be apparent from the following description of the preferred embodiment, which illustrates, by way of example, the disclosed principles.

BRIEF DESCRIPTION OF THE DRAWINGS

FIGS. 8A-8C show a block diagram of a multiple aperture antenna radio with separate transmit and receive antennas.

FIGS. 9A-9C show a block diagram of a multiple aperture radio with integrated separate transmit and receive antennas.

FIGS. 11A-11C show a block diagram of a multiple aperture protected radio terminal with 4 integrated high isolation antenna apertures providing isolation between transmitters, receivers, and radios.

FIGS. 13A-13C show a block diagram of a multiple aperture radio terminal with 4 integrated high isolation antenna apertures providing isolation between transmitters, receivers, and radios.

FIGS. 14A-14C show a block diagram of a conventional multiple channel XPIC radio terminal with couplers and an OMT providing isolation between radios.

FIGS. 15A-15C show a block diagram of a multiple aperture multiple channel radio terminal with 6 integrated CTS antenna apertures providing isolation between transmitters, receivers, and radios.

FIGS. 16A-16C show a block diagram of a multiple aperture multiple channel radio terminal with 4 integrated CTS antenna apertures providing isolation between transmitters, receivers, and radios.

DETAILED DESCRIPTION

Embodiments of the present invention implement a radio architecture in which the isolation needed between the transmitter and receiver may be achieved through the use of separate antennas. The separate antennas may have sufficient isolation to (1) block the high power levels of the transmitter from desensitizing or damaging the receiver circuits within the transmitted spectrum, and (2) block the noise transmitted by the transmitter within the receive spectrum.

By combining two or more high isolation antennas into separate or integrated antenna arrays, isolation can be achieved between the transmitter and receiver of point-to-point radio heads (or equivalent radio heads implemented as multiple channel transmitters and multiple channel receivers whether as separate modules or integrated at any level), with the radio heads arranged to operate alternately on the same frequency and same polarization (as in a 1+1 protected configuration); on the same frequency and different polarizations (as in a cross polarized XPIC configuration); or on different frequencies (as in a 2+0 or bonded channel configuration). In each case the point-to-point radio system following this concept avoids the cost, electrical losses, weight, or parametric limitations associated with the filter/diplexer, coupler, and OMT combining networks.

Figure 1:
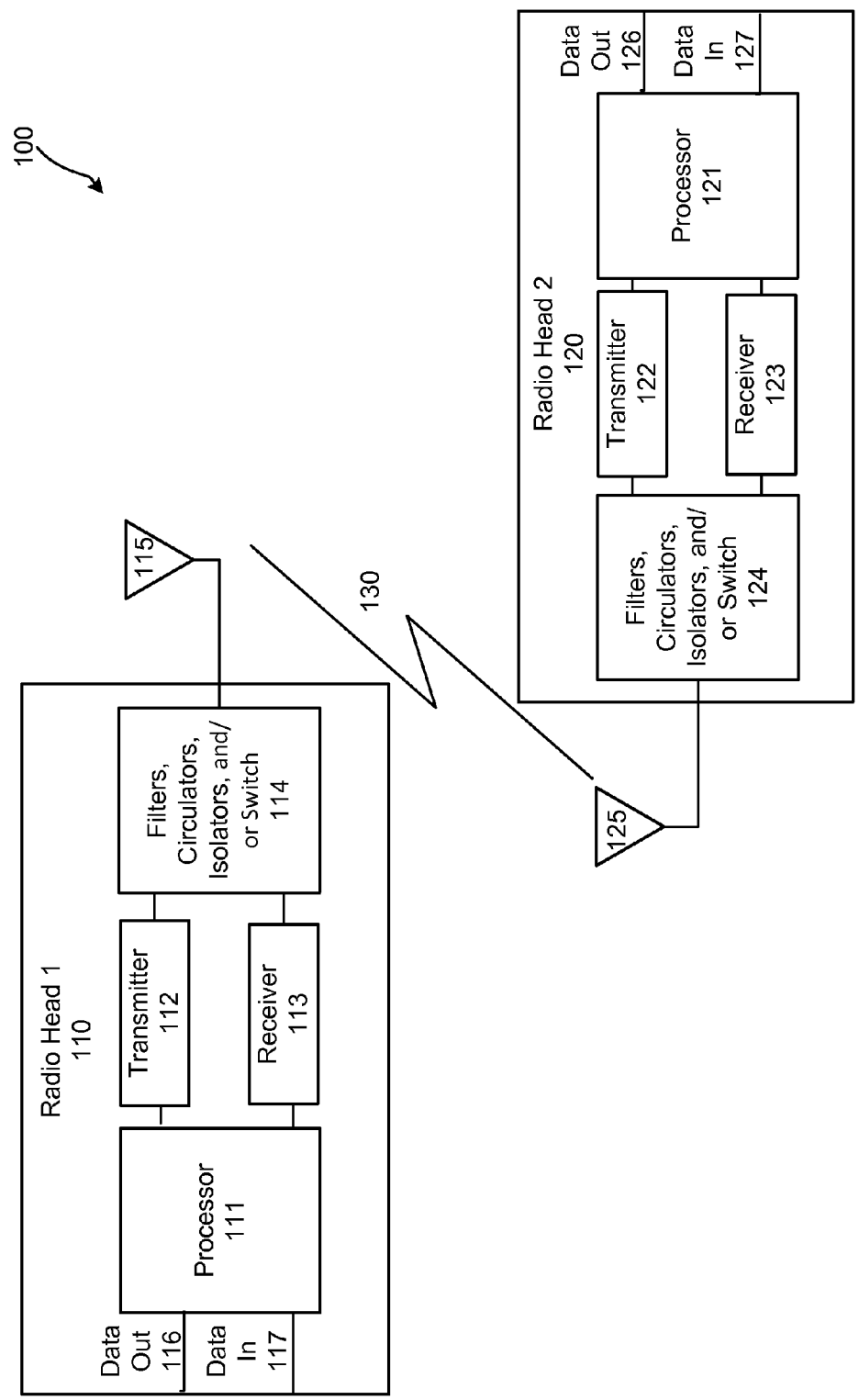
FIG. 1 shows a typical prior art point-to-point radio system.

A licensed band Point-to-Point (PtP) communications system uses two radios, one at each of the two locations, with the radios working together referred to as a radio link. point-to-point radio links are used worldwide to carry continuous bidirectional data, voice, and video information in both public and private networks. FIG. 1 shows a typical prior art point-to-point radio system 100 comprising a first radio head 110 configured to communicate 130 with a second radio head 120. The second radio head 120 may be identical to the first radio head 110. The information flow in each direction between the two points (i.e., radio heads) may be separated by Frequency Division Duplex (FDD) techniques where information in one direction is carried within an allocated bandwidth on a center frequency (F1) and the information in the reverse direction is carried within an identical allocated bandwidth on a different center frequency (F2).

Figure 2:
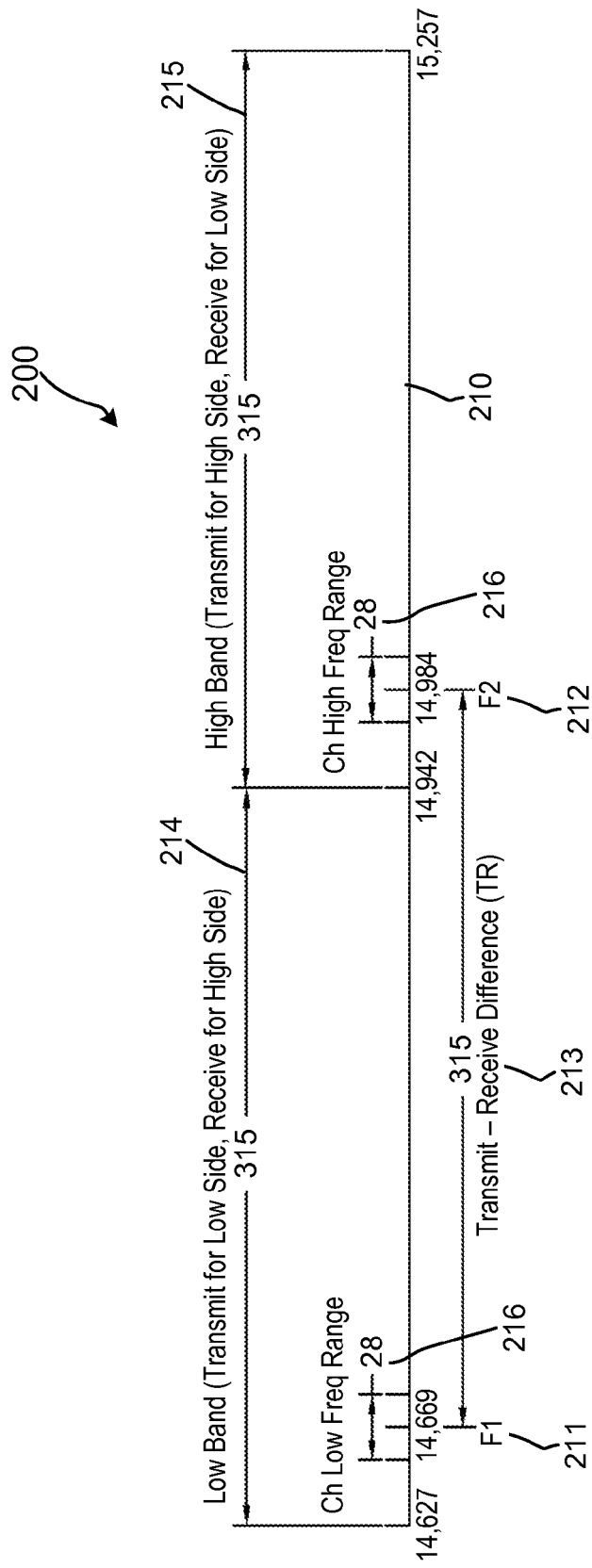
FIG. 2 shows an example of an assigned channel in the 15 GHz band with 315 MHz Transmit to Receive (TR) frequency spacing.

FIG. 2 shows an example of an assigned channel 210 in the 15 GHz band with 315 MHz Transmit to Receive (TR) frequency spacing. The frequency difference between F1 211 and F2 212 is the transmit-to-receive frequency difference 213 and is referred to as the TR difference, or more simply the TR. The TR 213 forms the basis for separating the total band 210 into a lower band 214 and a higher band 215 with the radios in the lower band 214 transmitting on one frequency and receiving on the other frequency, while the other radio is the reverse of that. For example, a first radio head may transmit on F1 (e.g., 14,669 MHz) 211 and receive on F2 (e.g., 14,984 MHz) 212 while a second radio head may transmit on F2 (e.g., 14,984 MHz) and receive on F1 (e.g., 14,669 MHz) 211. In cases where the total bandwidth of the allocated band of frequencies exceeds the assigned TR, the lower band and higher bands may overlap.

The point-to-point bands are divided into a lower and upper range of frequencies (which may overlap) and the radios are commonly identified with the portion of the band that they transmit on, therefore a "low band" radio transmits on the lower part of the band 214 (i.e., transmits on F1 211) and a "high band" radio transmits on the higher part of the band 215 (i.e., transmits on F2 212). These may also be referred to as the "go" radio and the "return" radio or the "East" radio and the "West" radio. The two frequency ranges 214, 215 are licensed together as a single communications channel 210 using one low band radio and one high band radio in a link.

The licensed use, antenna locations, frequencies, TR spacing, required spectral efficiency, antenna parameters, and other required technical parameters of the link may be defined by the licensing agency in each country, and may differ somewhat throughout the world. FIG. 1 shows an example of the frequency assignments within a band 210 and the relationship of the frequencies for a point-to-point link in the 15 GHz band 210 with a 28 MHz bandwidth 216 and 315 MHz TR 213.

In current practice the transmit and receive circuits for each radio are connected to a common antenna and these circuits are isolated from each other by either a set of filters or a combination of filters, circulators, and/or Isolators which connect them to the antenna, yet separate (isolate) them from each other. The isolation between the receiver and transmitter of each radio is needed for two reasons: (1) prevention of damage or reduced function of the receiver from the high RF power levels in the frequency range being transmitted by the transmitter; and (2) desensitizing the receiver by noise coming from the transmitter in the frequency range of the signal desired to be received by the receiver.

Isolation is needed to prevent the high level of power from the transmitter (which will be transmitting to the far side over the assigned bandwidth at a center frequency of either F1 or alternatively F2) from reaching the sensitive circuits of the receiver (which will be receiving from the far side at a center frequency either F2 or alternatively F1), and either desensitizing or damaging those receiver circuits. The isolation needed to prevent receiver loss of sensitivity or damage may be accomplished by a combination of circulators and isolators which allow most of the energy entering the transmitter port of the network to pass in one direction to a common antenna port, but prevent essentially all of that energy from being passed to the receiver port; or by filters between the common antenna port and the receiver port which block the higher power at F1 (F2) from the receiver but allow essentially all energy at the desired receive frequency F2 (F1) to pass from the antenna to the receiver, or by a combination of circulators, isolators, and filters.

In common practice, the level of power that may desensitize or cause damage to a receiver is on the order of −10 dBm to −20 dBm and the level of transmitted power is on the order of +15 dBm to +35 dBm, requiring isolation between the receiver and transmitter in the most extreme cases on the order of 55 dB.

The noise generated and being transmitted by the near end transmitter circuits is broadband in nature and much stronger than the background noise inherent in the atmosphere. This higher level of noise includes noise in the frequency range of the far end transmitter, which is the desired signal of the near end receiver, and this transmitted noise must be prevented from reaching the near end receiver and blocking the information coming from the radio on the other end of the link.

The highest level of transmitted noise allowed to be broadcast is set by the licensing agencies and is typically 50 dB below the power level of the intentionally transmitted data. The highest typical power level of noise exiting from the transmitter occurs when the transmitter is operating at the highest output power and for a typical point-to-point transmitter is in the range of −15 dBm (50 dB below the highest typical transmitted power of approximately +35 dBm). The threshold level of the receivers is affected by the noise bandwidth set by the channel bandwidth filters (typically from 3.75 MHz to 56 MHz) and typically falls into a range of −90 dBm to −65 dBm, with the highest threshold occurring with the widest bandwidth.

Figure 3:
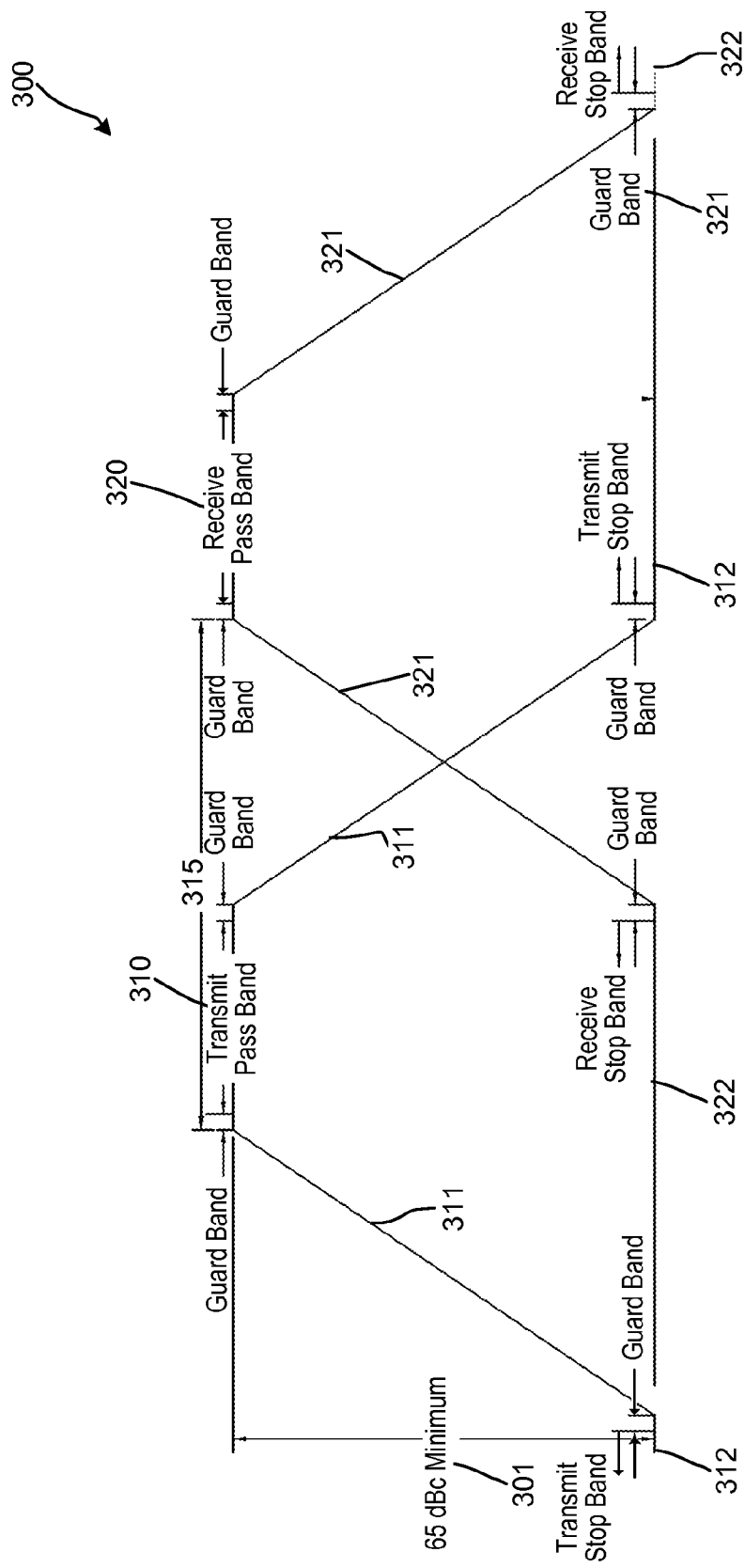
FIG. 3 shows a typical frequency response for transmit and receive filters adequate to provide isolation between the transmitter and receiver with a 315 MHz Transmit to Receive (TR) frequency spacing.

The noise entering the receiver from the transmitter must be well below the threshold level of the receiver, set by the noise received from the ambient environment, and typically is limited to about 15 dB below the threshold value. So, the isolation required from the transmitter to the receiver is on the order of 65 dB to 90 dB, with the smaller (65 dB) isolation applicable to the wider bandwidths presently used for high capacity radios. The transmitted noise that occurs in the frequency range of the receiver is commonly reduced by the use of a filter in the path from the transmitter to the common antenna which allows the desired transmitter frequencies to pass to the antenna while blocking the noise energy from the transmitter in the frequency range of the receiver. The frequency response of filters in the transmitter path capable of providing the isolation needed to reject the transmitted noise from entering the receiver and in the path of the receiver capable of providing the isolation needed to prevent damage to the receiver from the high transmitter power in its intended operating frequency range is shown in FIG. 3. FIG. 3 shows a typical frequency response for transmit and receive bandwidth filters adequate to provide isolation between the transmitter and receiver with a 315 MHz Transmit to Receive (TR) frequency spacing.

Figure 4:
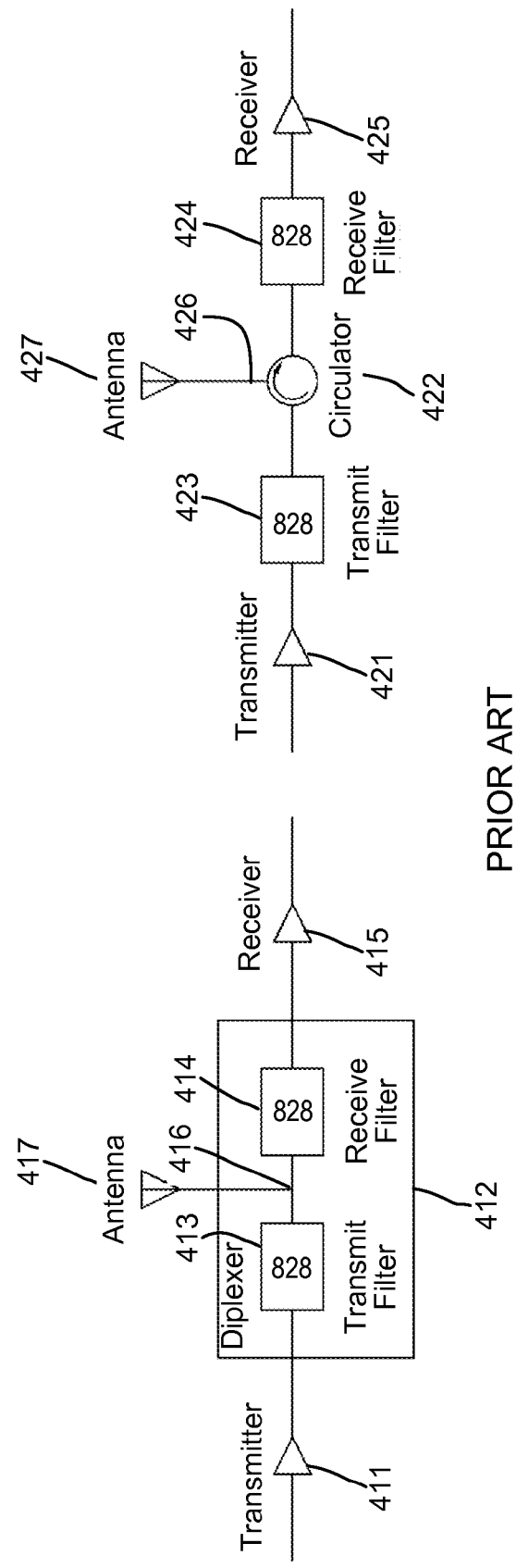
FIGS. 4A and 4B show a block diagram of transmitter to receiver isolation from diplexer and filter/circulator configurations.

FIGS. 4A-4B show a block diagram of transmitter to receiver isolation from diplexer (FIG. 4A) and filter/circulator configurations (FIG. 4B). The required level of isolation is achieved in most cases by the use a three port device referred to as a diplexer (or duplexer) 412, which is a combination of the two filters 413, 414 with one filter 413 from the transmitter to the common antenna port 416 used to block transmitted noise energy that falls outside of the desired transmit frequency range 310 from leaving the transmitter 411 and the second filter 414 from the common antenna port 416 to the receiver 415 that blocks energy from entering the receiver 415 that falls outside of the desired receive frequency range 320. The isolation of the transmit filter 413 is set by the isolation needed to block the noise from the transmitter 411 that falls into the desired receive frequency range 320, and the isolation of the receive filter 414 is set by the level needed to prevent the high power transmitted signal from damaging or desensitizing the receiver 415. The level of isolation to prevent unwanted noise from entering the receiver 415 is typically greater than the level of isolation needed to prevent damage to the receiver 415, and in current practice may be in the order of 65 dB. In most cases the filters 413, 414 are designed to be meet the most demanding isolation case so that the same diplexer 412 can be used with either side connected to either the transmitter 411 or receiver 415 and therefore the same part can be used in both the go and return radio.

Additionally, as shown in FIG. 4B, as an alternative option to the diplexer or integrated as a part of the diplexer, the filters 423, 424 may be separate and connected to the common antenna port 426 through a circulator 422, which also directs transmit energy to the antenna 427 and received energy to the receiver 425. The circulator 422 may be used with separate filters 423, 424, or as described above it may be connected to form a three port diplexer (not shown) to provide the combination of connections to the transmitter 421, receiver 425, and antenna ports 426 as well as the filter functions. Of the options, the most common method is the 3-port diplexer without a circulator as shown in FIG. 4A.

While the guidelines of the International Telecommunications Union's Radiocommuncation (ITU-R) Sector are followed by most countries, resulting in some level of consistency between countries, in many cases the parameters may vary between countries. As an example, in the 15 GHz Band used for the examples above, there are 8 different TRs commonly in use (315 MHz, 322 MHz, 420 MHz, 475 MHz, 490 MHz, 640 MHz, 644 MHz, and 729 MHz), with each having a unique set of band edge frequencies.

Figure 5:
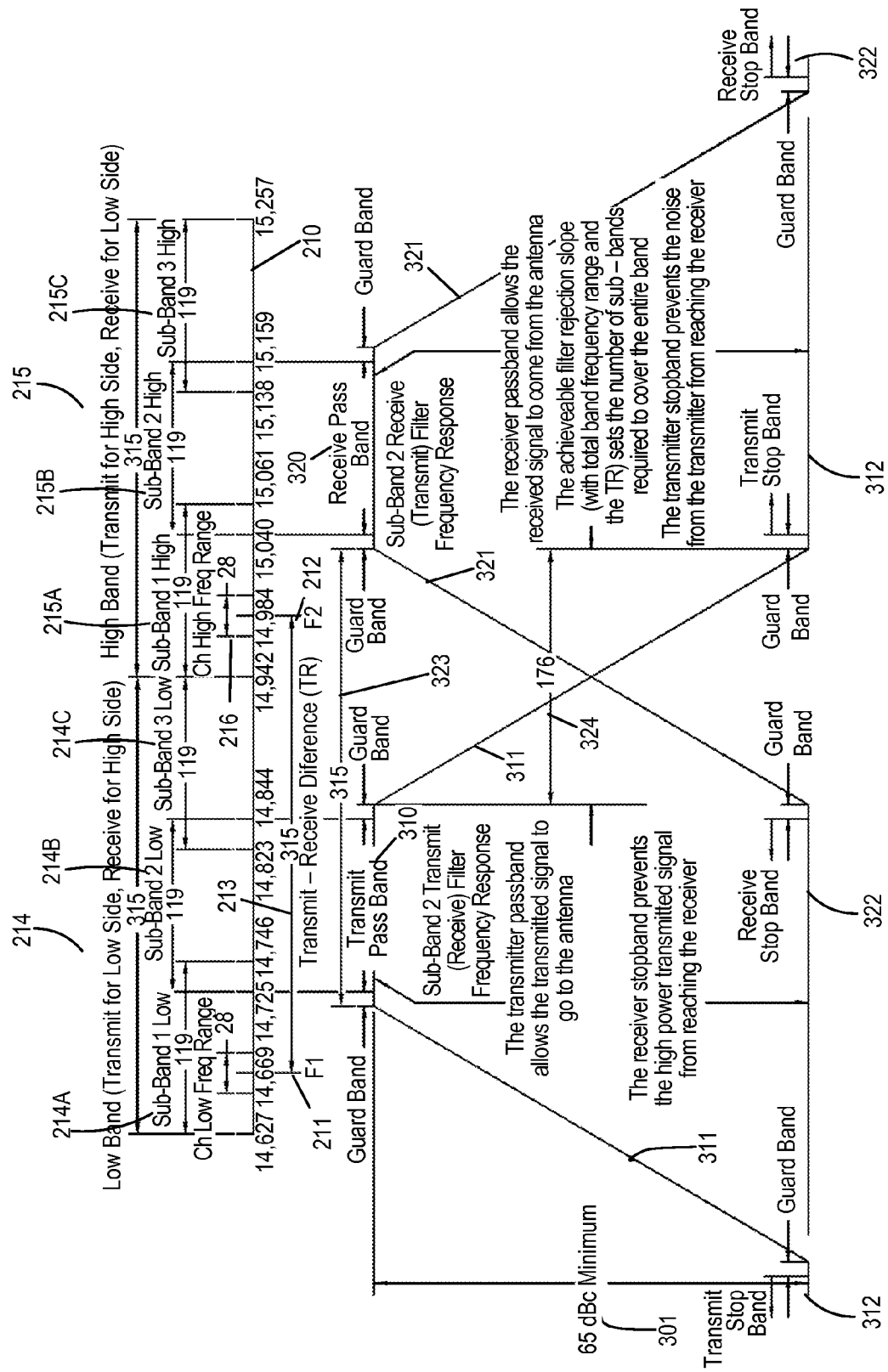
FIG. 5 shows a filter frequency response for a low side radio diplexer to provide transmit to receive isolation, with the resulting division of the band into sub-bands.

FIG. 5 shows a filter frequency response 300 for a low side radio diplexer to provide transmit to receive isolation, with the resulting division of the band 210 into sub-bands 214A-215C. The diplexer filters 413, 414 that isolate the transmitter 411 and receiver 415 should have a practical separation from the upper edge of the pass band 310 of the low side 214 to the lower edge of a stop band 312 for the high side 215. The typical diplexer shown in FIGS. 3 and 4A for the same 15 GHz band example discussed above is reproduced in FIG. 5, along with the frequency scale and the separation of the band 210 into three sub-bands 214A-215C to allow for diplexers 412 to isolate the transmitters 411 and receivers 415 with practical diplexer filters 413, 414. The bandwidth 310 of the filters 413, 414 may be set by the bandwidth 324 of the rejection slope 311, 321 of each filter (e.g., 176 MHz) and the TR spacing 323 (315 MHz in the example), which for the example of FIG. 5 is 315−176=139 MHz. The total number of sub-bands required to provide for achievable filters is then set by the maximum pass band per filter and the total allocated bandwidth 210 of the frequency band (e.g., 2×315=730 MHz). For the examples provided in FIGS. 1-4, six diplexers are used, three in the low part of the band and three in the high part of the band. Other configurations of diplexers and frequencies may be used without departing from the teachings in this disclosure. With appropriate design, the three lower and three upper diplexers can utilize the same parts and can be installed in reverse to create the six possible sub-bands.

From the examples, with four to six diplexer configurations required for each of the eight TR's assigned in various parts of the world to the 15 GHz Band, there are on the order of forty different diplexer filter combinations required for the same transmitter and receiver to be able to operate together as links in the various countries. When the fourteen different frequency bands commonly used for point-to-point communications around the world are considered (6 GHz lower, 6 GHz upper, 7 GHz, 8 GHz, 11 GHz, 13 GHz, 15 GHz, 18 GHz, 23 GHz, 26 GHz, 28 GHz, 32 BHz, 38 GHz, and 42 GHz), along with the various TRs assigned by the licensing agencies, hundreds of filter combinations may be required for effective coverage.

Use of Frequency Bandwidth and Signal Polarity to Increase Data Rates

The increasing use of wireless communications and the need to connect (backhaul) the resulting increase in the amount of data passing through the wireless networks, such as data from cellular telephone sites connecting to the central switching circuits of the wireless system operators, has caused a demand for higher data rates to be carried by the wire line, fiber, and wireless point-to-point communication systems that provide the backhaul.

For the licensed band point-to-point systems, combinations of mechanisms have been employed to increase available data rates. Two principal philosophies can be employed: (1) Increase the number of data bits sent per Hz of bandwidth (b/Hz), or (2) increase the amount of bandwidth (Hz) used. Increases in the b/Hz rate have been constantly growing through improving digital processing techniques and improved analog fidelity in the analog RF circuits, and increases in the bandwidth have increased to a limited extent by using wider licensed bandwidths, by using both horizontal and vertical polarizations along with digital processing techniques (cross polarization interference cancellation or "XPIC"). The most aggressive techniques employ both.

Doubling the data bandwidth, such as, for example, using 112 MHz wide channels in place of 56 MHz channels, and dual polarity/XPIC processing, can each double the data capacity of a point-to-point link, resulting in as much as four times the capacity of most of the current 56 MHz bandwidth single-polarity high capacity point-to-point links. The use of a wide channel, such as, for example, the ETSI 112 MHz channels can be accomplished by either (1) spreading the total information across a single wide bandwidth signal (i.e., implementing a wide channel) or (2) by dividing the information into two separate but adjacent narrow bandwidth (e.g., 56 MHz) signals and sending the two narrow bandwidth signals through the wide bandwidth (e.g., 112 MHz) channel or alternately through two separate (and separated) narrow bandwidth (e.g., 56 MHz) channels. When the data is split into two separate signals and recombined at the other end, the process is referred to as "bonding" the channels (i.e., using bonded channels). When adequately licensed, either wide channels or bonded channels can be sent through a single polarity or doubled by sending through dual polarity XPIC signals.

Figure 6:
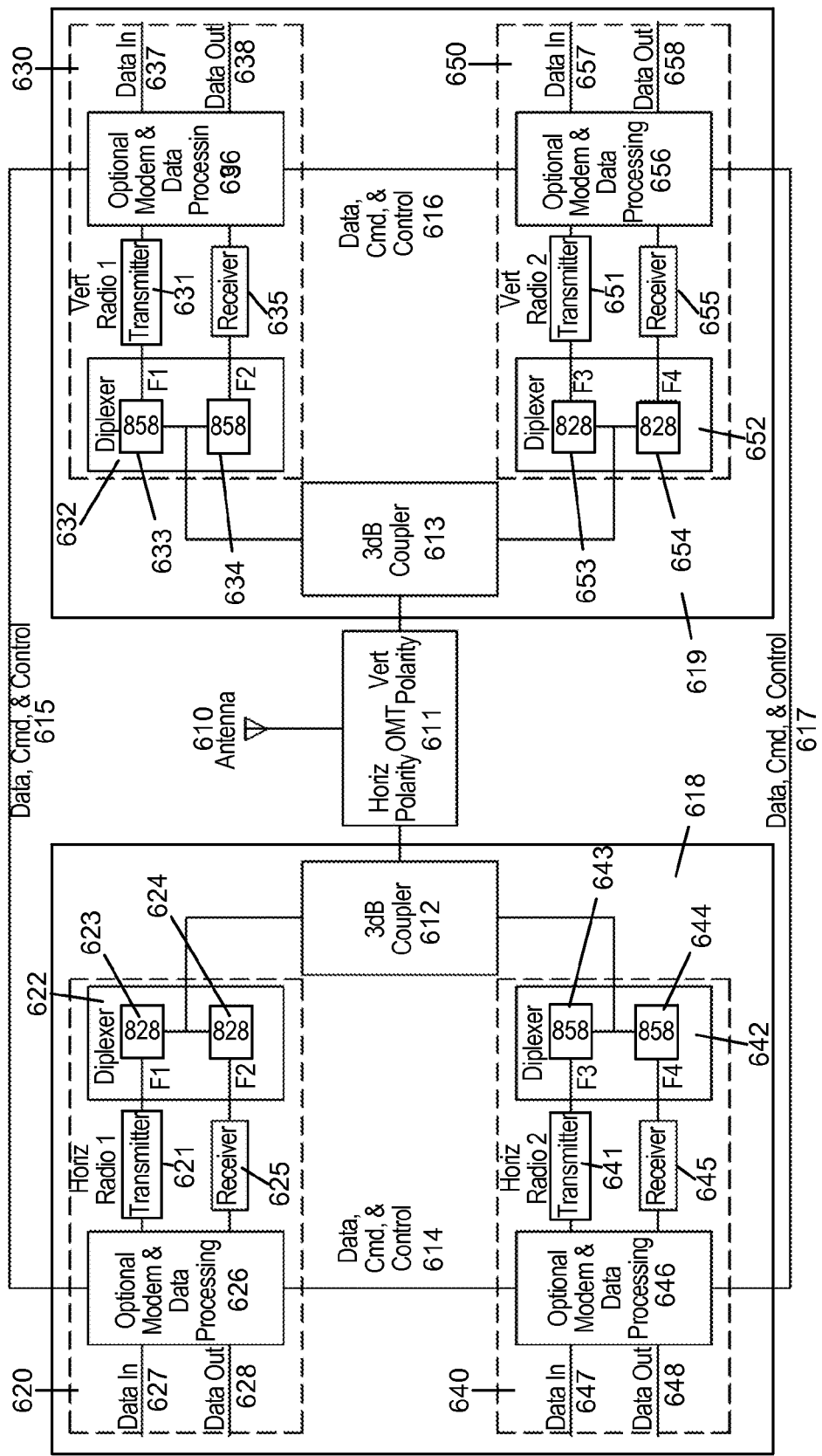
FIG. 6 shows a block diagram of an exemplary bonded channel XPIC configuration.

The use of wide channels is not yet in common practice, as the digital processing and high speed mixed signal components needed to accomplish this remains limited, and the availability of the wide channels is restricted in many localities to newly assigned frequency bands as increasing use of the microwave spectrum limits the number of unused wide channels.

Where separated channels (non-adjacent) are bonded, typically two separate radios (or the equivalent circuitry) must be connected to an antenna in such a way as to provide isolation between the two Radios to prevent distortion of the individual signals. The most common method for this is coupling the radios through an equal loss (3 dB) coupler which isolates the radios at the expense of inserting a somewhat greater than 3 dB loss (typically 3.5-3.8 dB) into the path of each radio. FIG. 6 shows a block diagram 600 of an exemplary bonded channel XPIC configuration. With this device, the signal from the antenna 610 is split equally between the two devices (i.e., the horizontal polarization radio head 618 and the vertical polarization radio head 619) with each device isolated from the other by approximately 3 dB. The signal to the antenna 610 from the device suffers the same 3 dB loss from the coupler 612, 613. This configuration has been used for some time and is referred to as a 2+0 configuration.

An identical hardware architecture has also been in common use for some time in protected radio applications where only one of the two radios 618, 619 is in use at any time, while the other is powered and standing by, ready to take over if the primary radio fails to operate properly. This configuration is referred to as a 1+1 configuration. The difference in the two uses of this configuration (2+0 and 1+1) is that the two radios 618, 619 in the first use are operating at the same time on different channels (e.g., see FIGS. 14A-14C) while in the protected architecture both radios are set to the same channel and only one transmits at any given time (e.g., see FIGS. 10A-10C).

To use XPIC techniques, the signals from two separate transmitters 621/641, 631/651 may be coupled to an antenna 610 structure in such a way as to allow the two separate signals to be transmitted in the orthogonal (horizontal and vertical or "H" and "V") polarities (i.e., orthogonal polarizations) and received at the far end of the link and routed to the correct receiver 625/642, 635/655. The XPIC digital processing then aids recovery of the data from each of the polarities by using the signal from each receiver 625/642, 635/655 to help remove the distortion of the other receiver from unwanted coupling between the polarities. This is typically done using two separate radios 618, 619 and connecting them to an antenna 610 using an ortho-mode transducer (OMT) 611 which combines the two radio signal paths into orthogonal paths for connection to an antenna 610 capable of sending and receiving dual polarity signals. The OMT 611 inserts a loss on the order of 0.5 to 1.0 dB into the signal path of each antenna 610. The OMT 611 can be implemented as a part of the antenna 610, a part of the radio 618, 619, or as a separate mechanical device 611.

Implementation of wide channel XPIC systems typically use two separate radios (or the equivalent circuitry) 620/640, 630/650 for each polarity, or four radios (or the equivalent circuitry) total 620-640, with two sets 618, 619 of two radios 620/640, 630/650 combined through an equal loss coupler 612, 613, and each of those sets 618, 619 connected to the antenna 610 through an OMT 611. The combination adds the loss of one coupler 611, 612 (3.5-3.8 dB) plus the loss of the OMT 611 (0.5-1.0 dB) to each radio path for a total loss of approximately 4.0 to 4.8 dB to each end of the link, or a net loss of 8.0 to 9.6 dB to the system gain.

I. Use of Two or More Separate Antennas (Multiple Apertures) for Receive and Transmit Functions Embodiments of the present invention implement a radio architecture in which the isolation needed between the transmitter and receiver may be achieved through the use of separate antennas. The separate antennas may have sufficient isolation to (1) block the high power levels of the transmitter from desensitizing or damaging the receiver circuits within the transmitted spectrum, and (2) block the noise transmitted by the transmitter within the receive spectrum.

Conventional antenna structures use parabolic or near-parabolic shaped reflector lens structures to redirect energy from a waveguide feed mechanism into a narrower beam, however, the level of isolation for these antennas is limited. Improved isolation is available from high isolation antenna structures, such as, for example, those with port to port isolations of 50 dB or greater when the antennas are mounted side by side including, a Horn, Horn with a dielectric lens (Lensed Horn), Slotted Waveguide Array (SWA), Waveguide Trough Array (WTA), or a Continuous Transverse Stub (CTS) antenna. Although the WTA or CTS antennas have not been previously utilized for the purposes described herein, they may be used in a preferred embodiment of the multiple aperture concept of the present invention. The operating frequency of the radio may affect the choice of the high isolation antenna structure, where lower frequencies such as below 10 GHz may favor a SWA structure, very high frequencies such as above 50 GHz may favor a Horn or Lensed Horn structure, and frequencies between 10 GHz and 50 GHz may favor a WTA or CTS structure.

By combining two or more high isolation antennas into separate or integrated antenna arrays, isolation can be achieved between the transmitter and receiver of point-to-point radio heads (or equivalent radio heads implemented as multiple channel transmitters and multiple channel receivers whether as separate modules or integrated at any level), with the radio heads arranged to operate alternately on the same frequency and same polarization (as in a 1+1 protected configuration); on the same frequency and different polarizations (as in a cross polarized XPIC configuration); or on different frequencies (as in a 2+0 or bonded channel configuration). In each case the point-to-point radio system avoids the cost, electrical losses, weight, and parametric limitations associated with the filter/diplexer, coupler, and OMT combining networks.

For an equivalent antenna gain, and equal antenna efficiencies, the use of the two apertures may increase the overall aperture area by a factor of 2. Conversely if the total antenna apertures are the same, only one-half of the area is available for each antenna, representing a loss in antenna gain of 3 dB.

The eliminating of the Diplexer, Coupler, and/or OMT may be achieved through the use of an array of two or more antennas which exhibit a high level of isolation between the antennas. The antennas may be fully integrated into a common structure, closely mounted, or widely separated. When fully integrated into a common structure or closely mounted to a common mounting structure, a means of individually pointing or aligning the antennas may be provided to account for angular shifts between the main radiating beam of the antennas, as different main beam angular alignment relatively to the antenna mounting features may exist between different antennas, including any angular shift of the main beam as a function of frequency. One preferred antenna configuration is referred to as the Waveguide Trough Antenna (WTA) and a second preferred antenna is the Continuous Transverse Stub (CTS) architecture.

An underutilized feature of certain high isolation antennas including the Horn, Lensed Horn, SWA, WTA and CTS architectures are extremely high port-to-port isolation of adjacent antennas. This high isolation, when optimized for this parameter, allows the signals transmitted by one antenna to be isolated from an adjacent or nearby antenna, aligned to the same distant point, by a sufficient amount to prevent meaningful interaction between the receiver and the transmitter. This allows the use of independent antennas (and antenna apertures) to coexist at the same location and eliminates limitations of the components needed to connect them to a single antenna.

Additionally, the inherently rectangular structure of the WTA and CTS antennas allows close packing of the independent apertures, compared to the typical round apertures of reflector-based antenna architectures, to form a minimal area form factor.

In the preferred embodiment implementing WTA or CTS antennas, the WTA and CTS antennas may in some implementations be slightly more efficient than reflective lens antennas, and with the elimination of a diplexer when using the multiple aperture concept, the reduced loss from not using a diplexer offsets much of the lost gain from the smaller size of each (receive and transmit) antenna. Accordingly, where equal antenna visible aperture size is desired embodiments of the present invention eliminate the band coverage limitations of the diplexer coupled transmitters and receivers. Where the antenna visible aperture size is allowed to grow, although some low loss filtering may be needed for system optimization, the reduced antenna gain can be totally offset or even increased by the eliminated loses. As a design parameter, the antenna size can be increased as desired to add gain where aesthetic and mechanical limitations allow. Accordingly, a realistic expectation of a system embodying the multiple aperture present invention would use an antenna array large enough to offset the difference in the combination of antenna gain and diplexer plus coupler plus OMT loses to create an equal system gain equivalent configuration. Additionally, by utilizing the preferred WTA or CTS antennas, the inherent low side-lobe performance without the use of shrouds common to the reflective lens antennas, and the integration of the radio head electronics into the antenna structure, provides for a thinner total outline and therefore an overall lower volume, cost, and weight even though the total antenna aperture area may be larger.

Figures 7A, 7B, 7C:
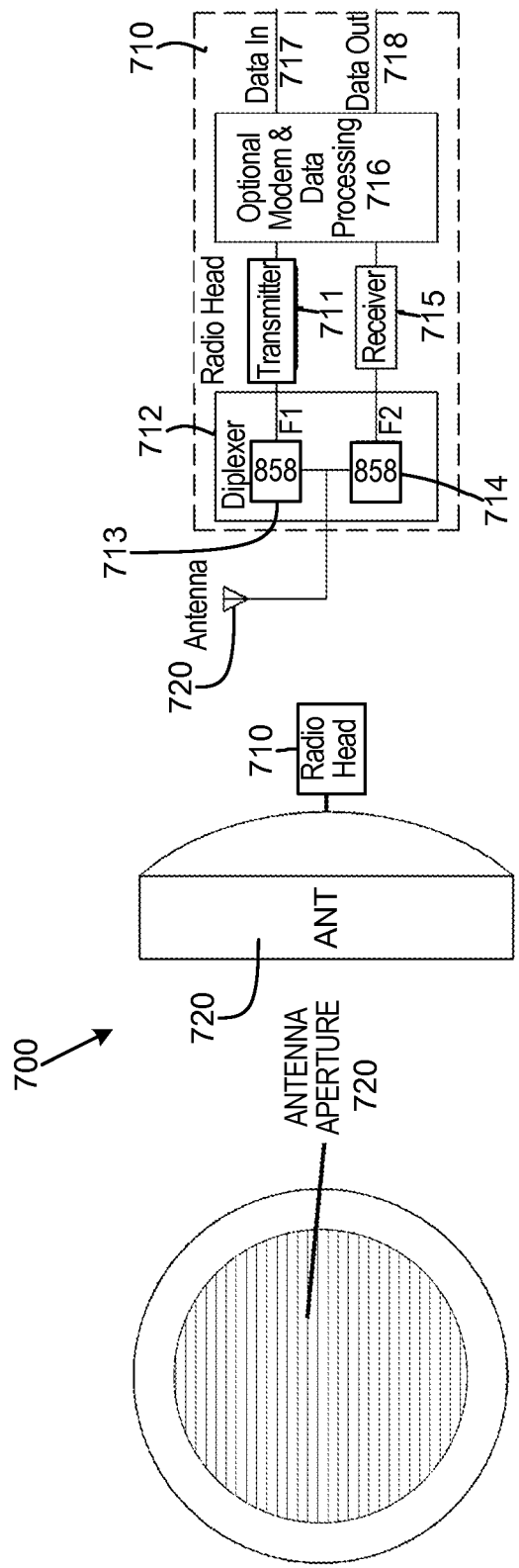
FIGS. 7A-7C show a block diagram of conventional point-to-point radio with reflective antenna and diplexer isolation of a transmitter and a receiver.

The basic configuration for a conventional point-to-point radio is shown in FIGS. 7A-7C, a multiple aperture antenna radio with separate receive and a transmit antennas is shown in FIGS. 8A-8C, and a multiple aperture radio with integrated separate antennas is shown in FIGS. 9A-9C. The radio head may include only the radio frequency (RF) and analog portions of the radio or may also contain the digital portions associated with modem and other digital processing functions.

FIGS. 7A-7C show block diagrams of various levels of abstraction for a conventional point-to-point radio 700 with an antenna 720 and a radio head 710 with diplexer isolation 713 of a transmitter 717 and a receiver 715. FIG. 7A shows a perspective view of an antenna aperture 720 of a radio 700 in one end of a conventional point-to-point radio communication system. FIG. 7B shows a block diagram of a single antenna 720 coupled to a single radio head 710 in one side of a conventional point-to-point radio communication system with radios 700 with diplexer isolation 713.

FIG. 7C shows a block diagram of the components of the radio head 710. The radio head 710 may comprise a transmitter 711 coupled to a diplexer 712. The diplexer 712 is coupled to a single antenna 720. The diplexer comprises a first filter 713 coupled to the transmitter 711 that is configured to filter transmit signals before being passed to the antenna 720 from the transmitter 711. The diplexer 712 further comprises a second filter 714 coupled to the receiver 715 that is configured to filter received signals from the antenna 720 before being passed to the receiver 715. The transmitter 711 and the receiver 715 are both coupled to a modem and data processor 716 that is further coupled to a data input 717 and data output 718 for the radio head 710. A processor 716 may control the operation of the radio head 710 as well as process the received data signals, transmitted data signals, data input 717, and data output 718. The processor 716 may be optional depending on the type of communication system and the configuration of the radio head 710. The radio head 710 may transmit and receive communications to a second radio head (not shown) on the other side of a point-to-point radio system link through the antenna 720.

FIGS. 8A-8C show block diagrams of various levels of abstraction for a multiple antenna point-to-point communication radio 800 with a separate transmit antenna 814 and receive antenna 817, according to embodiments of the present invention. FIG. 8A shows perspective views of a multiple antenna apertures 814, 817 of a radio 800 in one end of a point-to-point radio communication system, according to embodiments of the present invention.

FIG. 8B shows a radio 800 of one end of a point-to-point radio communication system with multiple separate antennas 814, 817 coupled to a single radio head 810 through separate antenna interfaces 813, 816. The radio head 810 is coupled to a transmit antenna interface 813 which couples the radio head 810 to a first antenna (i.e., transmit antenna) 814. The radio head 810 is further coupled to a receive antenna interface 816 which couples the radio head 810 to a second antenna (i.e., receive antenna) 817.

FIG. 8C shows a block diagram of a radio head 810 according to embodiments of the present invention. The radio head 810 may comprise a modem and data processor 811 coupled to a transmit circuit (i.e., transmitter) 812 that is configured to operate at a first frequency (F1). The transmitter 812 may be coupled to a transmitter antenna interface 813 that couples the transmitter 812 to an antenna 814 that is configured to transmit signals at the first frequency. The transmit antenna interface 813 may be configured such that the antenna interface 813 does not cause a substantial electrical loss for a signal passed from the transmitter 812 to the transmit antenna 814. Accordingly, the transmit antenna interface 813 may include, for example, an electrical wire, waveguide, lead, or any other suitable material, path, transmitter and receiver, or other suitable transmission element that passes signals from a transmit circuit 812 to an antenna 814 without causing more than negligible electrical losses.

The processor 811 may also be coupled to a receive circuit (i.e., receiver) 815 configured to operate at a second frequency (F2). The receiver 815 may further be coupled to a receive antenna interface 816 that couples the receiver 815 to an antenna 817 that is configured to receive signals at the second frequency (F2). The receive antenna interface 816 may be configured such that the receive antenna interface 816 does not cause a substantial electrical loss for a signal passed from the receive antenna 817 to the receiver 815. Accordingly, the receive antenna interface 816 may include, for example, an electrical wire, waveguide, lead, or any other suitable material, path, transmitter and receiver, or other suitable transmission element that passes signals from a receive antenna 817 to a receiver 815 without causing more than negligible electrical losses. The receive antenna 814 may be separate and independent from the second antenna 817.

In other embodiments, the two antennas may be integrated into a single antenna array. For example, FIGS. 9A-9C show block diagrams of various levels of abstraction for a multiple antenna point-to-point communication radio 900 with a separate transmit antenna 914 and receive antenna 917 that have been incorporated into a single antenna array 920. FIG. 9A shows perspective views of a multiple antenna apertures 914, 917 of a radio 900 at one end of a point-to-point radio communication system, according to embodiments of the present invention. FIG. 9B shows a block diagram of a radio head 910 coupled to multiple antenna apertures incorporated into a single antenna array 920 with a transmit antenna 914 and a receive antenna 917. The radio head 910 is coupled to a transmit antenna interface 913 which couples the radio head 910 to a first antenna (i.e., transmit antenna) 914. The radio head 910 is further coupled to a receive antenna interface 916 which couples the radio head 910 to a second antenna (i.e., receive antenna) 917. Accordingly, the point-to-point communication system radio head 910 shown in FIGS. 9A-9C is identical to that described in reference to FIGS. 8A-8C above. However, in the radio 900 shown in FIGS. 9A-9C, the multiple antennas 914, 917 of the radio head 910 have been incorporated into a single integrated antenna array 920.

By integrating the antennas into an array, and integrating the radio head electronics into the same mechanical structure, interconnections between radio segments and functions that allow coordination of command and control and aggregation of the data streams through multiple radio carriers, is greatly simplified and provides for higher levels of integration of the system resulting in a high capacity multi-gigabit data rate system in a single package.

II. Use of Sets of Separate Receive and Transmit Antennas (Multiple Apertures) for Protected Radio Configurations An extension of the basic point-to-point radio is the combination of two radios for operation of one or the other at any given time. In this configuration both radios are tuned to the same frequency and the primary radio operates in a normal fashion while the other radio (i.e., protection radio) remains off but ready to operate in the event of a malfunction of the active radio (i.e., primary radio). This configuration is typically called a 1+1 protected system.

Figures 10A, 10B, 10C:
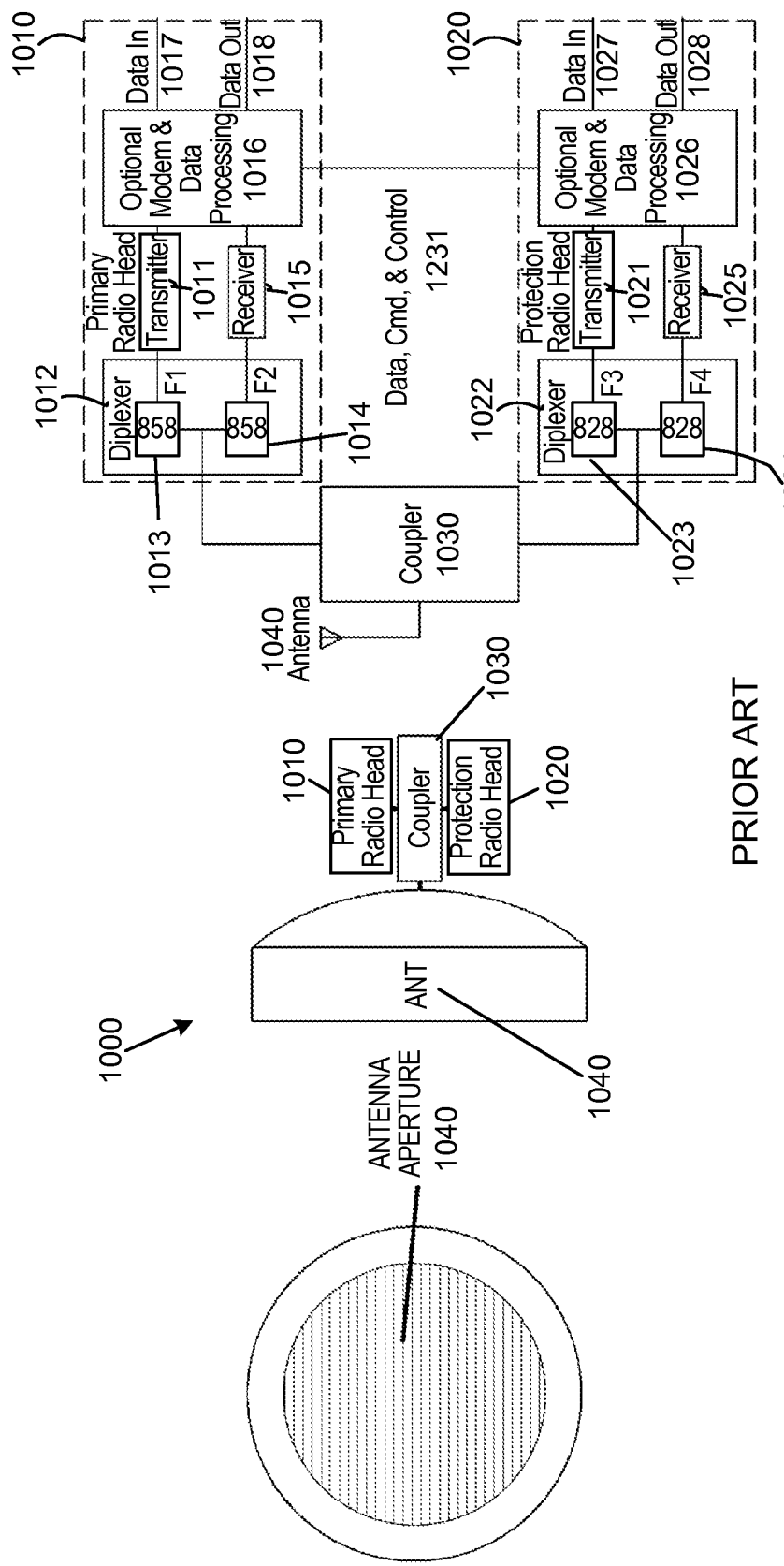
FIGS. 10A-10C show a block diagram of a conventional 1+1 protected radio terminal with couplers providing isolation between radios.

FIGS. 10A-10C show block diagrams of various levels of abstraction for a conventional point-to-point radio implementing a 1+1 protected radio terminal 1000 with couplers 1030 providing isolation between a primary radio head 1010 and a protection radio head 1020. As shown in FIG. 10B, 1+1 protected radio systems 1000 typically use a coupler 1030 to connect the two radios 1010, 1020 to a common antenna 1040 through either an equal power splitting (3 dB coupling loss to each path) or an unequal power splitting such as from a 10 dB coupler (approximately 0.5 dB coupling loss through one path and approximately 9.5 dB coupling loss through the other). The couplers 1030 may have an added insertion loss (typically in the order of 0.5 dB) making the actual loss either 3.5 dB per path for the equal loss case or approximately 1.0 dB and 10.0 dB for the 10 dB coupler case. When compared to a single radio with a conventional circular antenna (e.g., the radio of FIGS. 7A-7C), the configuration with an equal loss coupler will have approximately 3.5 dB per radio or 7 dB added to the link loss for both the primary 1010 and the protection radio 1020.

FIGS. 11A-11C show block diagrams of various levels of abstraction for a multiple aperture protected radio terminal 1100 with high isolation antenna apertures 1114/1124, 1117/1127 (e.g., integrated continuous transverse stub (CTS) antenna apertures) providing isolation between transmitters 1112, 1122, receivers 1115, 1125, and radios 1110, 1120, according to an exemplary embodiment of the present invention. The multiple aperture protected radio terminal 1100 may comprise two radio heads, a first radio head that is a primary radio head and a second radio head that is a protection radio head. The primary radio head and the protection radio head may operate alternately, and the transmitters 1112/1122 of the primary radio head 1110 and the protection head 1120 may be configured to operate on the same frequency. Accordingly, the receivers 1115/1125 of the primary radio head 1110 and the protection head 1120 may also be configured to operate on the same frequency.

The primary radio head 1110 may be identical to the radio heads described in reference to FIGS. 9A-9C and FIGS. 10A-10C above, and the protection radio head 1120 may be identical to the primary radio head 1110. Accordingly, the 1+1 protected radio terminal 1100 may comprise four antennas 1114/1124, 1117/1127 including two separate antennas for each radio head 1110, 1120.

In comparison, the combination of gains and losses for the four aperture 1+1 protected radio terminal 1100 compared to a single radio with a conventional circular antenna (e.g., the radio 700 shown in FIGS. 7A-7C) of equal total visible area is a net loss of approximately 3.8 dB to 4.2 dB, with 6 dB of loss from the smaller antenna apertures and 0.8 dB to 2.2 dB gain from not having the diplexer loss. This is equal to 7.6 dB to 8.4 dB of added link loss.

Therefore, as a comparison between the equal loss coupler configuration (e.g., the radio 1000 shown in FIGS. 10A-10C) and an equal-aperture-area multiple-aperture equivalent (e.g., the radio 1100 shown in FIGS. 11A-11C) implemented in current embodiments of the present invention, the four aperture approach will have as much as 1.4 dB more loss than the configuration with the coupler. For example, with corrections for the added area to the conventional antennas for side-lobe reduction shrouds and the similar mechanical borders to the WTA or CTS antennas for a radome to the visible areas of each, for equal system gain the net increase in the total surface area for the multiple aperture concept using WTA or CTS antennas is approximately 10%. However, embodiments of the present invention provide an added benefit of lower total occupied volume and no diplexer restrictions.

The unequal loss coupler configuration allows lower loss in the primary path (i.e., primary head 1010 to antenna 1040), while a higher loss is seen in the protection path (i.e., protection head 1020 to antenna 1040). Accordingly, when all is well, the principal path may have less overall loss than with the equal power configuration, but at the expense of more loss when the primary radio 1010 fails and the protection radio 1020 is called into action. In both cases the losses add to both ends of the link and at best are approximately 2 dB for the primary radio 1010 and at worst approximately 20 dB for the protection radio 1020.

For the case of the conventional 10 dB coupler configuration, a comparison of visible antenna frontal area for the four-aperture multiple-aperture approach 1100, when corrected for the shrouds and borders as above, shows that an increase of approximately 56% in total visible aperture area 1130 will provide equal gain for the primary radio 1110. As the multiple-aperture case 1100 has equal gain for both radios 1110, 1120, the same increase provides an 18 dB increase in system gain for the radio providing protection 1120 and again provides the benefit of less total occupied volume and no diplexer restrictions.

Therefore, in embodiments of the invention, the antenna size may be used as a system design parameter, where the antenna size can be adjusted as needed to increase gain or reduce size to provide the same or more gain as a conventional system, as aesthetic and mechanical limitations allow.

Accordingly, embodiments of the present invention provide the benefit that the multiple aperture approach for any chosen gain configuration eliminates the tuning range limitations of the diplexer coupled transmitters and receivers inherent in the conventional systems, and eliminates the cost, weight, and mechanical constraints of the diplexers and couplers contained in the conventional systems. However, in some applications, such as the unequal gain coupler typically used in protected systems, embodiments of the present invention can increase the system gain for some modes of operation even though the individual apertures are much smaller than the conventional antennas when the total antenna surface area is held constant.

III. Use of Sets of Separate Receive and Transmit Antennas (Multiple Apertures) for Bonded Channel Radio Configurations A very similar approach to the 1+1 protected system is a 2+0 radio system in which the same combination of two radios are used differently by setting the two radios to different channels (i.e., operating at different frequencies) and operating them at the same time (i.e., simultaneously). The 2+0 configuration may double the data capacity and if the data stream is configured to be divided between the two radio sets, the radios are said to be "Bonded". The systems are similar to those shown in FIGS. 10A-10C and 11A-11C. Accordingly, the systems are not shown in the figures. Refer to the above description and referenced figures for descriptions of the systems.

When implemented in a conventional system (not shown), the bonded radios may be configured through equal loss couplers as they are expected to be equally capable. For this case, the comparison to the multiple aperture concept (not shown) is equivalent to the equal loss couplers described above and the area of the total multiple apertures must be approximately 12% greater than a typical conventional system using separate radios combined using couplers to a single reflective lens antenna.

As with the 1+1 radio system, the primary benefit from the multiple aperture approach is the elimination of the tuning range limitations of the diplexer coupled transmitters and receivers inherent in the conventional systems, as well as the eliminated cost, weight, and mechanical constraints of the diplexers and couplers contained in those conventional systems.

IV. Use of Sets of Separate Receive and Transmit Antennas (Multiple Apertures) for Cross Polarized (XPIC) Radio Systems One of the most discussed conventional approaches to increasing the capacity of point-to-point radio systems is the use of two radio systems operating on the same channel but using orthogonal polarities (horizontal and vertical) to reduce the interference of one radio with the other. This configuration is similar in many respects to the 2+0 system in which the radios operate on different channels but are typically on the same polarity.

The dual polarity system requires additional digital processing of the received signals to further reduce the distortions of each signal by the signal on the opposite polarity. This processing uses the received signal from the opposite polarity receiver to remove the distortions and is referred to as cross polarity interference cancellation (XPIC) and the system using this process is often referred to as an XPIC system.

Figures 12A, 12B, 12C:
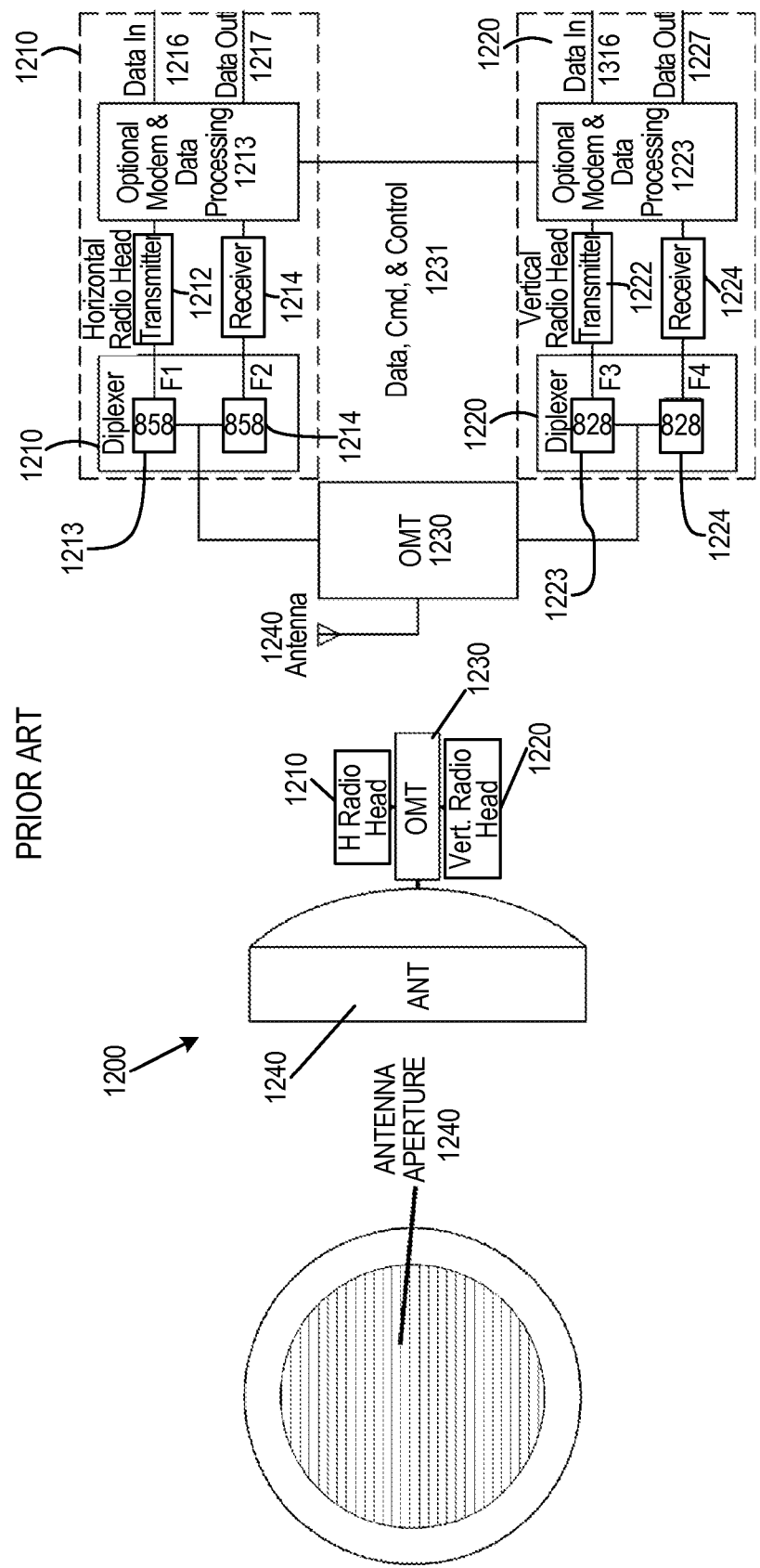
FIGS. 12A-12C show a block diagram of a conventional XPIC radio terminal with an ortho-mode transducer (OMT) providing isolation between radios.

FIGS. 12A-12C show block diagrams of various levels of abstraction for a conventional XPIC radio terminal 1200 with an ortho-mode transducer (OMT) 1230 providing isolation between radio heads 1210, 1220. As shown in FIG. 12B, In an XPIC system 1200 the two radios 1210, 1220 are connected to a common antenna 1240 through an Ortho-Mode Coupler (OMT) 1230. The OMT 1230 combines the signals in a waveguide structure to send them on to the antenna 1240, which must be capable of accepting and coupling the signals to the air interface for both polarities. The electrical loss of the OMT 1230 is much less than from a coupler and is typically in the order of 0.5 to 1.0 dB.

In the multiple aperture concept, the OMT 1230 is eliminated and each of the two radios are connected directly to an individual antenna aperture with a transmit aperture and a receive aperture assigned to each the horizontal and vertical polarity. FIGS. 13A-13C show block diagrams of various levels of abstraction for a multiple aperture radio terminal with high isolation antenna apertures 1314/1324, 1317/1327 (e.g., integrated continuous transverse stub (CTS) antenna apertures) providing isolation between transmitters 1312, 1322, receivers 1315,1325, and radios 1310, 1320, according to an exemplary embodiment of the present invention. The multiple aperture radio terminal 1300 may comprise two radio heads 1310, 1320, a first radio head 1310 that is configured to operate at a first frequency channel (transmit at a first frequency and receive at a second frequency) and a second radio head 1310 that is configured to operate at a second frequency channel (transmit at a third frequency and receive at a fourth frequency). The first radio head 1310 and the second radio head 1320 may operate simultaneously, and the transmitters 1312/1322 of the first radio head 1310 and the second radio head 1320 may be configured to operate on different frequencies. Accordingly, the receivers 1315/1325 of the first radio head 1310 and the second radio head 1320 may also be configured to operate on different frequencies.

As in the cases described above, the OMT coupled paths of the conventional system 1200 have the loss of both the diplexer filter and the OMT, totaling approximately 2.0 to 3.0 dB, while the multiple aperture concepts 1300 do not. However with the multiple aperture approach 1300, given an equal area presented to a viewer, each aperture 1314/1324, 1317/1327 is smaller with an associated reduced gain.

For the best case of the conventional approach (e.g., FIGS. 12A-12C), the net gain difference between it and the multiple aperture design (e.g., FIGS. 13A-13C) provides a 4 dB loss on each end of the link for the multiple apertures. Considering the differences in supporting area for shrouds for the reflective lens antenna and a radome for the CTS, a net increase in the order of 73% is needed for the multiple aperture design to have equal system gain.

Again, as the primary benefit, the multiple aperture approach for any chosen gain configuration eliminates the tuning range limitations of the diplexer coupled transmitters and receivers inherent in the conventional systems, and eliminates the cost, weight, and mechanical constraints of the diplexers and couplers contained in the conventional systems. And, as a system design parameter, the antenna size can be adjusted to increase gain or reduce size.

V. Use of Sets of Separate Receive and Transmit Antennas (Multiple Apertures) for Combined Bonded Channel and Cross Polarized (XPIC) Radio Systems The highest capacity point-to-point systems accumulate bandwidth where available and use spectrum efficient modulation techniques to maximize the amount of data that is sent over that bandwidth. Duplicate licensed band point-to-point bandwidth is available in horizontal and vertical polarization polarities and systems using both polarities combined with the greatest available bandwidth, whether as continuous wide channels or as combined bonded channels, provide the highest capacities. The channels will be the widest that present technical and licensing restrictions allow, with the technical limitations typically coming into play for current available devices at a maximum of 56 MHz bandwidth and licensing limitations at 112 MHz bandwidth.

Figure 14C:
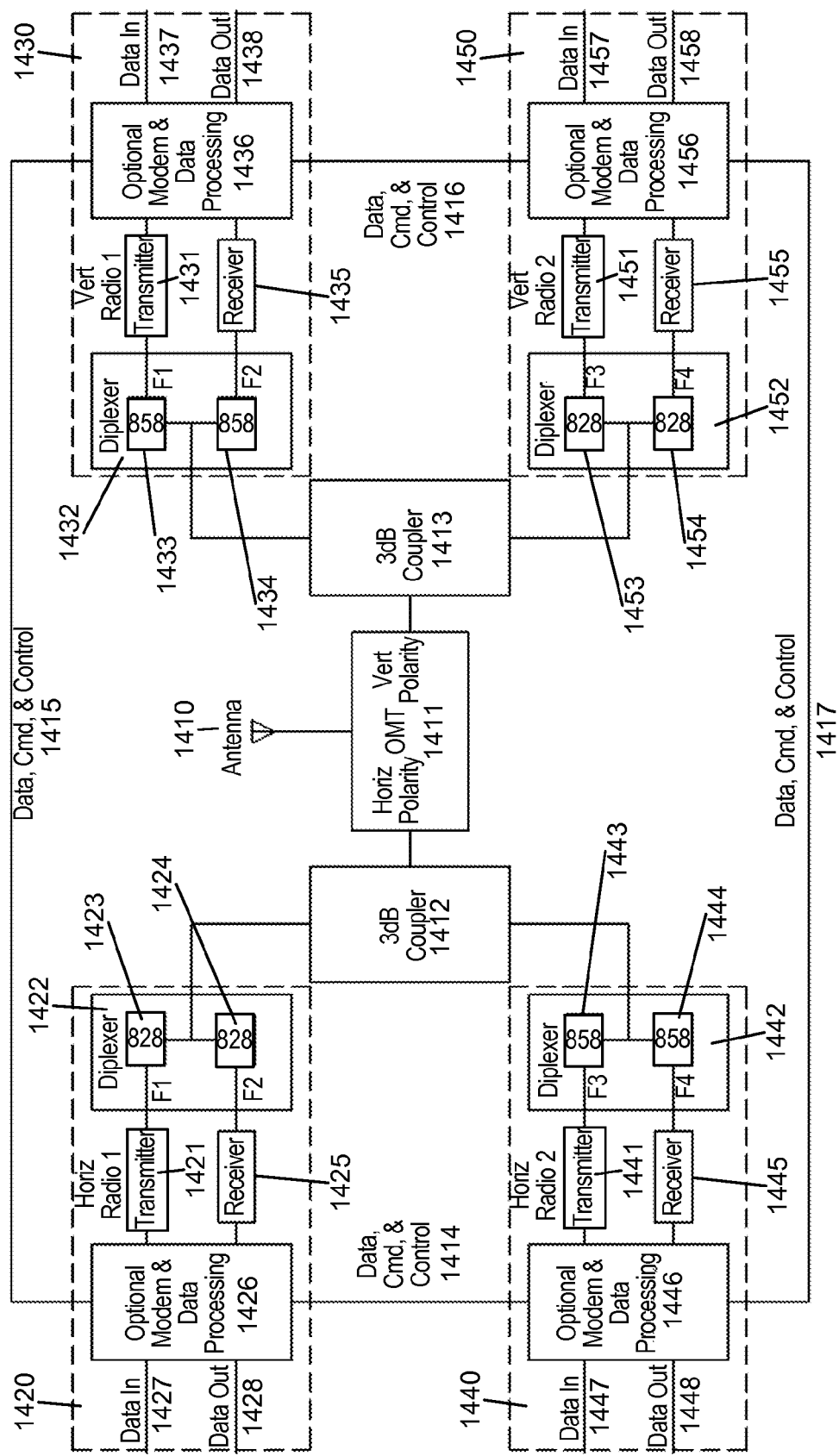

Currently, based on hardware limitations, these high capacity implementations may use two separate 56 MHz Bandwidth data channels to provide for a total of 112 MHz of assigned bandwidth, and duplicate these for the horizontal and vertical polarity (e.g., four radio heads). FIG. 14A-14C show block diagrams of various levels of abstraction of a conventional multiple channel XPIC radio terminal 1400 with couplers 1412, 1413 and an OMT 1411 providing isolation between radios 1420, 1430, 1440, 1450. While the hardware may be separated or integrated into single housings, the four radio head circuits carrying these four separate data streams may have two radio head circuits combined using an equal loss coupler 1412, 1413 for each polarity with a loss of 3.5 dB to 3.8 dB for the coupler 1412, 1413. The two radio head sets 1420/1430, 1440/1450 may be connected to the antenna 1410 using an OMT 1411 to place them in orthogonal polarities, with a typical 0.5 to 1.0 dB loss for the OMT 1411. For this combination each end of the link will see a total loss of approximately 4 dB to 4.8 dB.

Additionally the conventional radio head (e.g. radio head 1420), using a diplexer 1422 to combine the transmitter 1421 and receiver paths 1425 will have a loss in the diplexer 1422 of 1.0 dB to 2.0 dB. This causes a total loss from the transmitter 1421 or receiver 1425 to the antenna 1410 of 5.0 dB to 6.8 dB for each terminal and 10.0 dB to 13.6 dB for the link.

FIGS. 15A-15C show block diagrams of various levels of abstraction with multiple aperture multiple channel radio terminal 1500 with 6 integrated WTA or CTS antenna apertures 1514, 1524, 1534, 1544, 1554, 1552 providing isolation between transmitters 1512, 1522, 1532, 1542, receivers 1515, 1525, 1535, 1545, and radios 1510, 1520, 1530, 1540. Using the multiple aperture approach eliminates the diplexer, coupler, and OMT and couples each transmitter and receiver directly to the antenna through an antenna interface, with the antenna isolation providing the same functions as described in embodiments above, to prevent meaningful interaction between the transmitters 1512, 1522, 1532, 1542 and receivers 1515, 1525, 1535, 1545.

As there are four transmitters in this configuration, for maximum transmitted power, each transmitter may be connected to a separate antenna aperture. The antennas may be of the same type, or of different types, or a combination of types. However, with the loss of output power for a single data stream, the two horizontal transmit channels and the two vertical transmit channels may be combined such as to cause each of the polarities to use a single set of transmitter output stages along with a single transmit antenna aperture. FIGS. 16A-16C show block diagrams having at levels of abstraction for a multiple aperture multiple channel radio terminal 1600 with four integrated WTA or CTS antenna apertures 1652, 1654, 1656, 1658 providing isolation between transmitters 1612, 1622, 1632, 1642, receivers 1614, 1624, 1634, 1644, and radios 1610, 1620, 1630, 1640 and implementing a dual transmit function to reduce complexity further at the expense of transmit power (i.e. two transmit antennas instead of four). Combining the transmit data streams through the single transmitter final stages (after all frequency determining functions have been accomplished) effectively creates a dual transmit function. Combining these signals reduces the output power by a minimum of 3 dB, although in many cases nonlinearities of the final stages may cause distortion concerns that further reduce the available output power from the combined signals.

Thus, either two antenna apertures may be used for the transmit function by combining channels (as shown in FIGS. 16A-16C) or, for maximum transmit output power, four antenna apertures may be used with a separate antenna and power output amplifier allocated for each of the four data channels (as shown in FIGS. 15A-15C).

Two receive channels may be combined through a single low noise amplifier (LNA) 1653, 1657 to allow for separately receiving two data streams, effectively creating a dual receiver. Using such a dual receiver has little or no performance penalties and the two horizontal receive channels may use the same antenna aperture 1654, and the two vertical receive channels can be combined through a single antenna aperture 1658. Thus, only two receive apertures are required, one for horizontal signals and one for vertical signals. Both multiple aperture approaches provide the benefits of eliminating the frequency restrictions of the diplexer filters.

VI. Technical Advantages

Embodiments of the present invention provide a number of technical advantages. For example, the elimination of a diplexer from a radio head removes the tuning range limitations set by the diplexer filter bandwidths and allows a much smaller number of radio head designs, in some cases even a single design, to be capable of covering the available band in each of the defined point-to-point operating bands. This concept also allows using the same radio head to be used for any Transmit to Receive (TR) frequency spacing rather than having a set of diplexers for essentially each TR, whether the TR is presently defined or presently unused due to conventional filter limitations, including allowing side by side TR spacing where the passband edge of the transmit bandwidth is the same as one passband edge of the receive bandwidth, which allows operation in otherwise unusable narrow licensed and unlicensed bands, in which total bandwidth limitations prevent the use of current FDD equipment. Eliminating the diplexer also greatly reduces the cost of designing and manufacturing the radio heads, and allows pre-building and stocking of the lower number of products which reduces the lead time in procuring new and spare radio heads. Typical reductions in the number of designs to cover the most common 14 licensed bands for point-to-point applications is in the order of several hundred unique parts being reduced to as few as 14 unique parts.

Removal of the diplexer also removes the cost of the diplexer and the electrical loss of those circuits to increase the available transmit power and lower the receiver sensitivity such that the link gain of the system for equal gain antennas is increased in the order of typically 1.6 dB to 4.4 dB (0.8 to 2.2 for each radio). Alternately, the increased system gain can be used to offset the larger total aperture size of two antennas compared to a single antenna, and taking the advantage through the wide TR spacing allowed to a single radio.

The removal of couplers from protected point-to-point systems, where two (or more) radio heads share the same antenna, with one of the radio heads serving as a backup for the other(s), thereby providing protection for the link from complete data loss in the event of a failure of one of the radio heads, removes both the cost of the coupler(s) and the added loss, which will typically range from 1 dB to 4 dB for the primary radio head(s) and from 4 dB to 11 dB for the backup radio head. The removal of the coupler also reduces the weight of the combined radio head, coupler, and antenna assembly which reduces the loading of the antenna mounting structure.

Removal of the OMT from a cross polarized (orthogonal) radio head system, where two (or more) radio heads are combined to increase spectral efficiency by using the same frequency for two separate data streams on orthogonal polarities, eliminates the cost, weight, and electrical loss (which typically range from 0.5 to 1.5 dB) of the OMT.

For equal antenna gain, use of the multiple antennas, or multiple antenna apertures in an integrated array, will increase the total area of the antenna surface, and if equal surface area is required, the gain for each antenna will be reduced. However, the reduced losses offset some or all of this reduced gain and in some cases provide a net positive gain for equal total antenna aperture area. The relative gain trade-off for various configurations is discussed below. In each case, whether the system gain is reduced or increased, the advantage of the wide tuning range and low number of designs exists.

VII. Additional Embodiments

Figure 17:
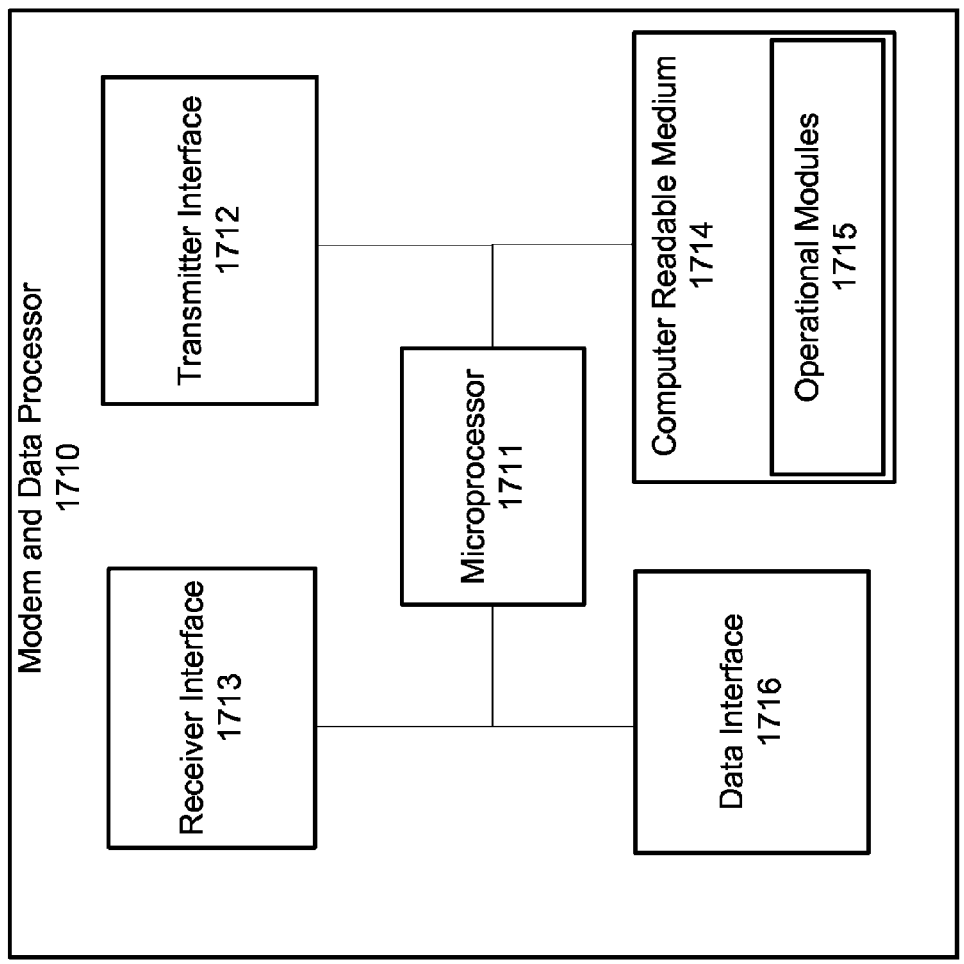
FIG. 17 shows a block diagram of an exemplary data and signal processor of a radio head according to exemplary embodiments of the present invention.

FIG. 17 shows a block diagram of an exemplary signal and data processor 1710 of a radio head, according to embodiments of the present invention. The processor of FIG. 17 may be implemented in any of the embodiments described above including radio heads shown in FIGS. 6-16C. The modem and data processor 1710 may comprise a microprocessor (i.e., processor) 1711, a transmitter interface 1712, a receiver interface 1713, a computer readable medium 1714 including any operational modules 1715 that are necessary to process received signals and transmit signals or communications as described herein, and a data interface 1716.

The transmitter interface 1712 may electrically couple the modem and data processor 1710 to one or more transmit circuits of a radio head and subsequently one or more transmit antennas. The transmitter interface 1712 may deliver the appropriate data signal from the modem and data processor to a transmit circuit and subsequently an antenna to be transmitter or sent to a second radio head.

The receiver interface 1713 may electrically couple the modem and data processor 1710 to one or more receive circuits of a radio head and subsequently one or more receive antennas. The receiver interface 1713 may deliver the received data signal from the receive circuits to the modem and data processor 1710 for further processing. The modem and data processor 1710 may ensure the radio head receives transmitted signals from a second radio head, transmits data inputs to the second radio head, and otherwise ensures the communication system operates correctly. The modem and data processor 1710 may also comprise (or be coupled to) any other processors, software modules, and/or hardware modules to complete any other tasks or activities necessary to ensure correct operation of the communication system as described herein.

The terms "machine readable medium" and "computer readable medium," as used herein, refer to any medium that participates in providing data that causes a machine to operate in a specific fashion. In an embodiment of the present invention implemented using a radio head as described herein, various machine-readable media might be involved in providing instructions/code to processors for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as storage devices. Volatile media includes, without limitation, dynamic memory, such as the working memory. Transmission media includes coaxial cables, copper wire, and fiber optics, including the wires that comprise a system bus and interconnect the various elements of the signal and data processor shown in FIG. 17, as well as various components of subsystems such as a communications subsystem or network delivery interface (and/or the media by which the communications subsystem provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the computer processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by point-to-point radio systems and point-to-multipoint radio systems as described herein. These signals, which might be in the form of electromagnetic signals, acoustic signals, optical signals, and/or the like, are all examples of carrier waves on which instructions can be encoded, in accordance with various embodiments of the invention.

The present invention has been described above in terms of presently preferred embodiments so that an understanding of the present invention can be conveyed. There are, however, many configurations of systems for managing the delivery of progressively downloaded video data not specifically described herein but with which the present invention is applicable. The present invention should therefore not be seen as limited to the particular embodiments described herein, but rather, it should be understood that the present invention has wide applicability with respect to video data delivery systems generally. All modifications, variations, or equivalent arrangements and implementations that are within the scope of the attached claims should therefore be considered within the scope of the invention.

We claim:

1. A radio head in a point-to-point communication system, the radio head comprising:
    a transmitter configured to operate at a first frequency;
    a receiver configured to operate at a second frequency; and
    a processor coupled to both the transmitter and the receiver, wherein the transmitter is further coupled to a first antenna interface that is coupled to a first antenna configured to transmit signals at the first frequency, and wherein the receiver is further coupled to a second antenna interface that is coupled to a second antenna configured to receive signals at the second frequency;
    wherein the radio head is a first radio head and wherein the processor is a first processor, wherein the first processor is coupled to a second processor of a second radio head, and wherein the second radio head comprises:
        a second transmitter configured to operate at a third frequency, and
        a second receiver configured to operate at a fourth frequency,
    wherein the second processor is coupled to both the second transmitter and the second receiver, wherein the second transmitter is further coupled to a third antenna interface coupled to a third antenna configured to transmit signals at the third frequency, and wherein the second receiver is further coupled to a fourth antenna interface coupled to a fourth antenna configured to receive signals at the fourth frequency,
    wherein the first radio head and the second radio head operate alternately, wherein the first frequency and the third frequency are the same, and wherein the second frequency and the fourth frequency are the same.

2. The radio head of claim 1, wherein the first antenna interface passes signals substantially without electrical loss from the transmitter to the first antenna, and wherein the second antenna interface passes signals substantially without electrical loss as received from the second antenna to the receiver.

3. The radio head of claim 1, wherein the first and second antenna are integrated into a single antenna array.

4. The radio head of claim 1, wherein the first radio head is a primary radio head, and wherein the second radio head is a protection radio head.

5. The radio head of claim 1, wherein the first radio head and the second radio head operate simultaneously on different frequencies, and wherein the first radio head and the second radio head are configured to send and receive signals having orthogonally different polarizations from each other.

6. The radio head of claim 1, wherein the first radio head and the second radio head operate simultaneously on the same frequencies, and wherein the first radio head and the second radio head send and receive signals having orthogonally different polarizations from each other.

7. The radio head of claim 6, wherein the first radio head is a horizontal polarity radio head, wherein the horizontal polarity radio head is configured to transmit and receive signals having a horizontal polarization, wherein the second radio head is a vertical polarity radio head, and wherein the vertical polarity radio head is configured to transmit and receive signals having a vertical polarization.

8. The radio head of claim 1, wherein the first antenna and the second antenna are high isolation antennas.

9. The radio head of claim 1, wherein at least one of the first antenna and the second antenna is a WTA or CTS antenna-type.

10. The radio head of claim 1, wherein the first antenna and the second antenna are of different antenna types.

11. A point-to-point radio communication system comprising:
    two or more radio heads, comprising at least a first radio head and a second radio head, each of the two or more radio heads including
        a transmitter configured to operate at a first frequency,
        a receiver configured to operate at a second frequency, and
        a processor coupled to both the transmitter and the receiver, wherein the transmitter is further coupled to a first antenna interface that is coupled to a first antenna configured to transmit signals at the first frequency, and wherein the receiver is further coupled to a second antenna interface that is coupled to a second antenna configured to receive signals at the second frequency;
    wherein the first radio head and the second radio head are configured to communicate with each other;
    a first antenna coupled to the first antenna interface of the first radio head, which is coupled to the transmitter of the first radio head;
    a second antenna coupled to the second antenna interface of the first radio head, which is coupled to the receiver of the first radio head;
    a third antenna coupled to the first antenna interface of the second radio head, which is coupled to the transmitter of the second radio head; and
    a fourth antenna coupled to the second antenna interface of the second radio head, which is coupled to the receiver of the second radio head, wherein the transmitter of the first radio head is configured to transmit a first signal using the first antenna, wherein the fourth antenna of the second radio head is configured to receive the first signal, wherein the transmitter of the second radio head is configured to transmit a second signal using the third antenna, and wherein the second antenna of the first radio head is configured to receive the second signal.

12. The point-to-point radio communication system of claim 11, wherein the first signal is transmitted at a first frequency and wherein the second signal is transmitted at a second frequency, wherein the first frequency and second frequency are different.

13. The point-to-point communication system of claim 11, wherein the first signal and the second signal are sent and received on a first channel, and wherein the system further comprises a second set of radio heads configured to send and receive signals on a second channel.

14. The point-to-point communication system of claim 11, wherein the first signal and the second signal have a first polarization, and wherein the system further comprises a second set of radio heads configured to send and receive signals having a second polarization, and wherein the second polarization is orthogonal from the first polarization.

15. The point-to-point communication system of claim 13, wherein the first signal and the second signal have a first polarization, and wherein the second set of radio heads are further configured to send and receive signals having a second polarization, and wherein the second polarization is orthogonal from the first polarization.

16. The point-to-point radio communication system of claim 11, wherein the first antenna interface of the first radio head does not cause electrical losses for signals passed from the transmitter to the first antenna of the first radio head, wherein the second antenna interface of the first radio head does not cause electrical losses for signals received from the second antenna of the first radio head and passed to the receiver, wherein the first antenna interface of the second radio head does not cause electrical losses for signals passed from the transmitter to the first antenna of the second radio head, and wherein the second antenna interface of the second radio head does not cause electrical losses for signals received from the second antenna of the second radio head and passed to the receiver.

17. The point-to-point radio communication system of claim 11, wherein the first and second antenna are integrated into a single antenna array.

18. The point-to-point radio communication system of claim 11, wherein the first antenna and the second antenna are high isolation antennas.

19. The point-to-point radio communication system of claim 11, wherein at least one of the first antenna and the second antenna is a WTA or CTS antenna-type.

20. A radio head in a point-to-point communication system, the radio head comprising:
a transmitter configured to operate at a first frequency;
a receiver configured to operate at a second frequency; and
a processor coupled to both the transmitter and the receiver,
wherein the transmitter is further coupled to a first antenna interface that is coupled to a first antenna configured to transmit signals at the first frequency, and wherein the receiver is further coupled to a second antenna interface that is coupled to a second antenna configured to receive signals at the second frequency,
wherein the radio head is a first radio head and wherein the processor is a first processor, wherein the first processor is coupled to a second processor of a second radio head, and wherein the second radio head comprises:
a second transmitter configured to operate at a third frequency, and
a second receiver configured to operate at a fourth frequency,
wherein the second processor is coupled to both the second transmitter and the second receiver, wherein the second transmitter is further coupled to a third antenna interface coupled to a third antenna configured to transmit signals at the third frequency, and wherein the second receiver is further coupled to a fourth antenna interface coupled to a fourth antenna configured to receive signals at the fourth frequency,
wherein the first radio head and the second radio head operate simultaneously, wherein the first frequency and the third frequency are different, and wherein the second frequency and the fourth frequency are different.

21. The radio head of claim 20, wherein the first antenna interface passes signals substantially without electrical loss from the transmitter to the first antenna, and wherein the second antenna interface passes signals substantially without electrical loss as received from the second antenna to the receiver.

22. The radio head of claim 20, wherein the first and second antenna are integrated into a single antenna array.

23. The radio head of claim 20, wherein the first antenna and the second antenna are high isolation antennas.

24. The radio head of claim 20, wherein at least one of the first antenna and the second antenna is a WTA or CTS antenna-type.

* * * * *

UNITED STATES PATENT AND TRADEMARK OFFICE
CERTIFICATE OF CORRECTION

| | | |
|---|---|---|
| PATENT NO. | : 8,750,792 B2 | Page 1 of 1 |
| APPLICATION NO. | : 13/836081 | |
| DATED | : June 10, 2014 | |
| INVENTOR(S) | : Charles Bowman and Behzad Moeenziai | |

It is certified that error appears in the above-identified patent and that said Letters Patent is hereby corrected as shown below:

In the Claims

Column 21, Claim 13, line 8, after "point-to-point" insert --radio--

Column 21, Claim 14, line 13, after "point-to-point" insert --radio--

Column 21, Claim 15, line 19, after "point-to-point" insert --radio--

Signed and Sealed this
Eleventh Day of November, 2014

Michelle K. Lee
*Deputy Director of the United States Patent and Trademark Office*